United States Patent
Wang et al.

(10) Patent No.: US 9,325,505 B2
(45) Date of Patent: Apr. 26, 2016

(54) APPARATUS AND METHOD FOR CONTENT ENCRYPTION AND DECRYPTION BASED ON STORAGE DEVICE ID

(71) Applicant: SAMSUNG Electronics Co., Ltd., Suwon-si, Gyeonggi-do (KR)

(72) Inventors: Weixin Wang, Suwon-si (KR); Hee-Chang Cho, Seoul (KR); Hyoung-Suk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 42 days.

(21) Appl. No.: 13/803,349

(22) Filed: Mar. 14, 2013

(65) Prior Publication Data

US 2013/0311781 A1 Nov. 21, 2013

(30) Foreign Application Priority Data

May 17, 2012 (KR) .................. 10-2012-0052576

(51) Int. Cl.
| | | |
|---|---|---|
| *H04L 9/32* | (2006.01) | |
| *H04L 9/08* | (2006.01) | |
| *G06F 21/10* | (2013.01) | |

(52) U.S. Cl.
CPC ............. *H04L 9/3247* (2013.01); *G06F 21/10* (2013.01); *H04L 9/0866* (2013.01); *H04L 9/3273* (2013.01); *H04L 2209/60* (2013.01)

(58) Field of Classification Search
None
See application file for complete search history.

(56) References Cited

U.S. PATENT DOCUMENTS

| | | | |
|---|---|---|---|
| 7,421,741 B2* | 9/2008 | Phillips, II | ............ H04L 63/045 380/259 |
| 2006/0218649 A1 | 9/2006 | Brickell et al. | |
| 2010/0014677 A1* | 1/2010 | Sato et al. | ...................... 380/279 |
| 2010/0091988 A1 | 4/2010 | Srinivasan et al. | |
| 2010/0138650 A1 | 6/2010 | Kang et al. | |
| 2010/0275036 A1* | 10/2010 | Harada et al. | .................. 713/189 |
| 2011/0219232 A1 | 9/2011 | Yamaguchi et al. | |
| 2011/0222691 A1 | 9/2011 | Yamaguchi et al. | |
| 2011/0299679 A1* | 12/2011 | Yamaguchi et al. | ............. 380/44 |
| 2012/0047372 A1* | 2/2012 | Fujita et al. | ................... 713/189 |
| 2013/0268771 A1* | 10/2013 | Blankenbeckler | ........ H04L 9/08 713/189 |

FOREIGN PATENT DOCUMENTS

| | | |
|---|---|---|
| EP | 2065829 | 6/2009 |
| KR | 10-2010-0126028 | 12/2010 |
| KR | 10-2011-0117169 | 10/2011 |

OTHER PUBLICATIONS

Netherlands Search Report dated Sep. 9, 2014 issued in NL Patent Application No. 2010643.

* cited by examiner

*Primary Examiner* — Saleh Najjar
*Assistant Examiner* — Louis Teng
(74) *Attorney, Agent, or Firm* — EIPG, PLLC

(57) ABSTRACT

An apparatus and method for encrypting content based on an identifier (ID) of a storage device and a decrypting apparatus and method corresponding thereto. The content recording device includes a storage device interface to receive a first primitive ID and a second primitive ID to identify first and second portions provided in a storage device from the storage device, and a processor to generate a media ID that is a unique ID of the storage device using the first primitive ID and the second primitive ID and to encrypt one or more contents using an encryption key generated using the media ID, wherein the storage device interface provides the content encrypted by the processor to the storage device.

21 Claims, 25 Drawing Sheets

APPARATUS AND METHOD FOR CONTENT ENCRYPTION AND DECRYPTION BASED ON STORAGE DEVICE ID

CROSS-REFERENCE TO RELATED APPLICATIONS

This application claims priority under 35 U.S.C. §119 from Korean Patent Application No. 10-2012-0052576 filed on May 17, 2012 in the Korean Intellectual Property Office, and all the benefits accruing therefrom under 35 U.S.C. 119, the content of which in its entirety are herein incorporated by reference.

BACKGROUND

1. Field

The present general inventive concept relates to an apparatus and method for encrypting content based on an identifier (ID) of a storage device and a decrypting apparatus and method corresponding thereto. More particularly, the present general inventive concept relates to an apparatus and method in which a unique ID of a storage device is used in generating keys for encryption and decryption of the content to prevent unauthorized copying and reproducing of the content by storing encrypted content in the device.

2. Description of the Related Art

Recently, various types of mobile storage devices have been introduced. The recently introduced mobile storage devices are becoming less bulky while having increased storage capability. In addition, an interface of a mobile storage device is detachably installed in a host device. Accordingly, the portability of the mobile storage device is being increasingly reinforced. For example, a memory card using a flash memory as storage means or a USB memory connectable to a USB (Universal Serial Bus) port has been introduced. In addition, SSD (Solid State Drive) has also been produced and is gradually in wide use. With the advent of an external hard disk, one of cheap storage devices, portability and mobility of computing systems have been provided, unlike a hard disk fixed on a conventional desktop computer.

In addition to the mobile storage device, a host device connected to the mobile storage device has also become small-sized. As described above, an environment in which digital content stored in the mobile storage device can be enjoyed using a mobile host device anytime anywhere is created, and content distribution formats are changing into digital data formats. Accordingly, technology for preventing illegal copying of digital content is getting more important.

In order to prevent digital content from being illegally copied, the digital content is preferably stored in the mobile storage device in an encrypted state rather than in an original state. The encryption is performed using a particular encryption key.

For example, when content is encrypted by a symmetric encryption algorithm, the encryption key may also be used as a decryption key. Thus, if the encryption key is leaked and then distributed together with encrypted content, the encrypted content can be decrypted by anyone to be reproduced. Therefore, it is necessary to prevent the encrypted content from being decrypted even if the encrypted content and the encryption key are simultaneously distributed. That is to say, it is necessary to develop encryption and decryption methods which can prevent decryption when the encrypted content is illegally copied to a storage device to the authorized storage device.

SUMMARY OF THE INVENTION

The present general inventive concept provides an apparatus and method for content encryption and decryption, in which a storage device ID is used as an encryption key of content to be stored in the storage device, or the encryption key is generated using the storage device ID.

The present general inventive concept also provides a content recording apparatus and method, which can prevent a storage device ID from being leaked in using the storage device ID as an encryption key of content to be stored in the storage device.

The present general inventive concept also provides a content playing apparatus and method using a storage device ID as a decryption key of encryption content stored in a storage device.

The present general inventive concept also provides a content recording apparatus and method, which can prevent a storage device ID from being leaked in using the storage device ID as an encryption key of content stored in the storage device.

The present general inventive concept also provides an apparatus and method for content encryption and decryption, in which a storage device ID is used as an encryption key of content stored in the storage device, or the encryption key is generated using the storage device ID.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a content recording device including a storage device interface to receive a first primitive ID and a second primitive ID to identify first and second portions included in a storage device from the storage device and a processor to generate a media ID that is a unique ID of the storage device using the first primitive ID and the second primitive ID and to encrypt content using an encryption key generated using the media ID, wherein the storage device interface provides the content encrypted by the processor to the storage device.

The foregoing and/or other features and utilities of the present general inventive concept may also be achieved by providing a storage device including a memory device to store encrypted content to be decrypted to a decryption key generated using a media ID which is a unique ID of the storage device and a primitive ID, and a controller to control the memory device, wherein the primitive ID includes a controller ID that is a unique ID of the controller and an encrypted memory ID, the memory ID being a unique ID of the memory device, and the media ID is generated using a memory derived ID generated from the memory ID and the controller ID.

The foregoing and/or other features and utilities of the present general inventive concept may also be achieved by providing a content playing device including a storage device interface to receive encrypted content stored in a storage device, a first primitive ID and a second primitive ID to identify first and second parts provided in the storage device, from the storage device, and a processor to generate a media ID that is a unique ID of the storage device using the first primitive ID and the second primitive ID, to decrypt the encrypted content using a decryption key generated using the media ID and plays the decrypted content.

The foregoing and/or other features and utilities of the present general inventive concept may also be achieved by providing a content playing device including a storage device interface connectable to a first storage device to receive a first primitive ID and a second primitive ID to identify first and second portions included in the first storage device from the storage device, and a processor to generate a first media ID that is a unique ID of the first storage device using the first primitive ID and the second primitive ID, and to fail to decrypt as a result of attempting to decrypt the encrypted content with a decryption key generated using the first media ID, wherein the encrypted content stored in the first storage device are encrypted using an encryption key generated using a second media ID that is a unique ID of a second storage device different from the first storage device.

The foregoing and/or other features and utilities of the present general inventive concept may also be achieved by providing a content storing server including a receiving unit to receive content and a memory derived ID generated using a memory ID from a first terminal, the memory ID being a unique ID of a memory device included in a storage device connected to the first terminal, a storing unit, an encrypting unit to encrypt the content using the memory derived ID and to store the encrypted content in the storing unit and a transmitting unit to transmit the encrypted content stored in the storing unit to a second terminal, wherein the first terminal and the second terminal belong to one terminal group.

The foregoing and/or other features and utilities of the present general inventive concept may also be achieved by providing a content encrypting and storing method including receiving a primitive ID stored in a storage device from the storage device and calculating a media ID that is a unique ID of the storage device using the primitive ID, generating an encryption key using the media ID, generating encrypted content by encrypting content using the encryption key, and providing the encrypted content to the storage device to be stored in the storage device.

The foregoing and/or other features and utilities of the present general inventive concept may also be achieved by providing a content decrypting method including receiving from a content storage device a primitive ID stored in the content storage device and calculating a media ID that is a unique ID of the content storage device using the primitive ID, receiving encrypted content stored in the content storage device, generating a content decryption key using the media ID and decrypting the encrypted content using the content decryption key.

The foregoing and/or other features and utilities of the present general inventive concept may also be achieved by providing a non-transitory computer-readable medium to contain computer-readable codes as a program to execute a content encrypting or decrypting method described above or to be described hereinafter.

The foregoing and/or other features and utilities of the present general inventive concept may also be achieved by providing a content encrypting/decrypting system connectable to a storage device, including a content recording device configured to receive one or more identifiers associated with one or more functional portions of the storage device, to perform an encryption key generating operation to create an encryption key using the one or more identifiers, to encrypt one or more contents using the created encryption key, and to output the encrypted content. The one or more identifiers may correspond to one or more different areas or one or more different components of the storage device.

The content encrypting/decrypting system may further include a terminal configured to receive the encrypted content from the content recording device and the one or more identifiers from the storage device, to create a decryption key using the one or more identifiers, and to decrypt the encrypted content using the created decryption key.

The foregoing and/or other features and utilities of the present general inventive concept may also be achieved by providing a content encrypting/decrypting system connectable to a storage device, including a content playing device configured to receive one or more contents and one or more identifiers associated with one or more portions of the storage device, to perform a decryption key generating operation to create a decryption key, to decrypt the content using the created decryption key, and to output a signal corresponding to the decrypted content to be played.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
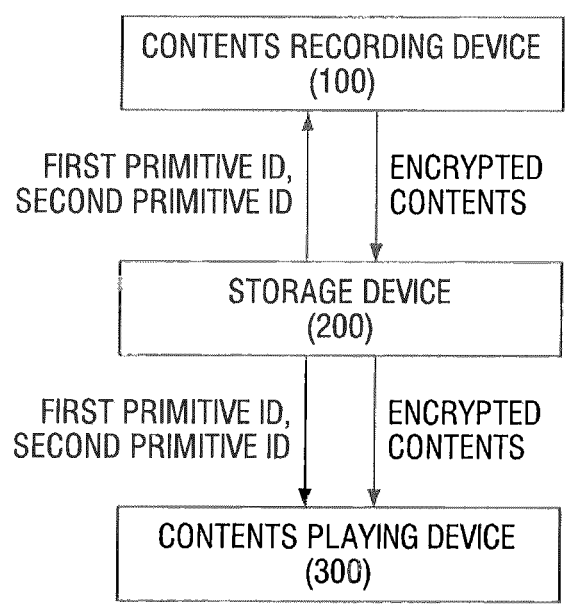
FIG. 1 is a block diagram illustrating a content encryption/decryption system according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. The present general inventive concept may, however, be embodied in different forms and should not be construed as limited to the embodiments set forth herein. Rather, these embodiments are provided so that this disclosure will be thorough and complete, and will fully convey the scope of the present general inventive concept to those skilled in the art. The same reference numbers indicate the same components throughout the specification. In the attached figures, the thickness of layers and regions is exaggerated for clarity. The use of the terms "a" and "an" and "the" and similar referents in the context of describing the general inventive concept (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which the present general inventive concept belongs. It is noted that the use of any and all examples, or exemplary terms provided herein is intended merely to better illuminate the present general inventive concept and is not a limitation on the scope of the present general inventive concept unless otherwise specified. Further, unless defined otherwise, all terms defined in generally used dictionaries may not be overly interpreted.

A configuration of a content encryption/decryption system 10 according to an embodiment of the present general inventive concept will now be described with reference to FIG. 1.

Referring to FIG. 1, the content encryption/decryption system 10 may include a content recording device 100, a storage device 200, and a content playing device 300. The content recording device 100 encrypts content stored in a storage device 200 or a storing unit (not illustrated) incorporated into the content recording device 100 or one or more contents received through a network to then store the encrypted content in the storage device 200. The content recording device 100 receives a primitive identifier (ID) stored in the storage device 200 from the storage device 200, generates an encryption key using the primitive ID, and encrypts the content using the encryption key. The storage device 200 may have an interface to wirelessly communicate with the content recording device 100 and/or the content playing device 300. The storage device 200 may have one or more connecting ports to be detachably attached to one or more connecting ports of the content recording device 100 and/or the content playing device 300 to communicate with each other. It is possible that the storage device 200 may be installed in the content recording device 100 and/or the content playing device 300.

The content playing device 300 decrypts and plays one or more encrypted contents stored in the storage device 200. The content playing device 300 receives the primitive ID stored in the storage device 200 from the storage device 200, generates a decryption key using the primitive ID, and decrypts the encrypted content using the decryption key.

Each of the content recording device 100 and the content playing device 300 may be provided for computers, UMPCs (Ultra Mobile PCs), work stations, net-books, PDAs (Personal Digital Assistants), portable computers, web tablets, wireless phones, mobile phones, smart phones, e-books, PMPs (Portable Multimedia Players), portable game devices, navigation devices, black boxes, digital cameras, 3-dimensional televisions, digital audio recorders, digital audio players, digital picture recorders, digital picture players, digital video recorders, digital video players, devices capable of transmitting/receiving information in wireless environments, one of various electronic devices constituting a home network, one of various electronic devices constituting a computer network, one of various electronic devices constituting a telematics network, RFID devices, one of various components constituting a computing system, or one of various components of an electronic device.

An encryption algorithm and an encryption key used in the encryption are not particularly limited, but an algorithm based on a symmetric key encryption system to have an encryption key and a decryption key equal to each other, for example, an encryption algorithm complying with AES (Advanced Encryption Standard), may be used. When the symmetric key encryption system is used, a method of the content recording device 100 generating the encryption key based on the primitive ID will be the same as a method of the content playing device 300 generating the decryption key based on the primitive ID.

As illustrated in FIG. 1, the primitive ID may include a first primitive ID and a second primitive ID. Both of the content recording device 100 and the content playing device 300 are capable of generating a media ID as a unique ID of the storage device 200 using at least one of the first primitive ID and the second primitive ID, and generating an encryption key or a decryption key using the media ID. The primitive ID is one or more identifying data usable in calculating the media ID and may be data different from the media ID.

Figure 2:
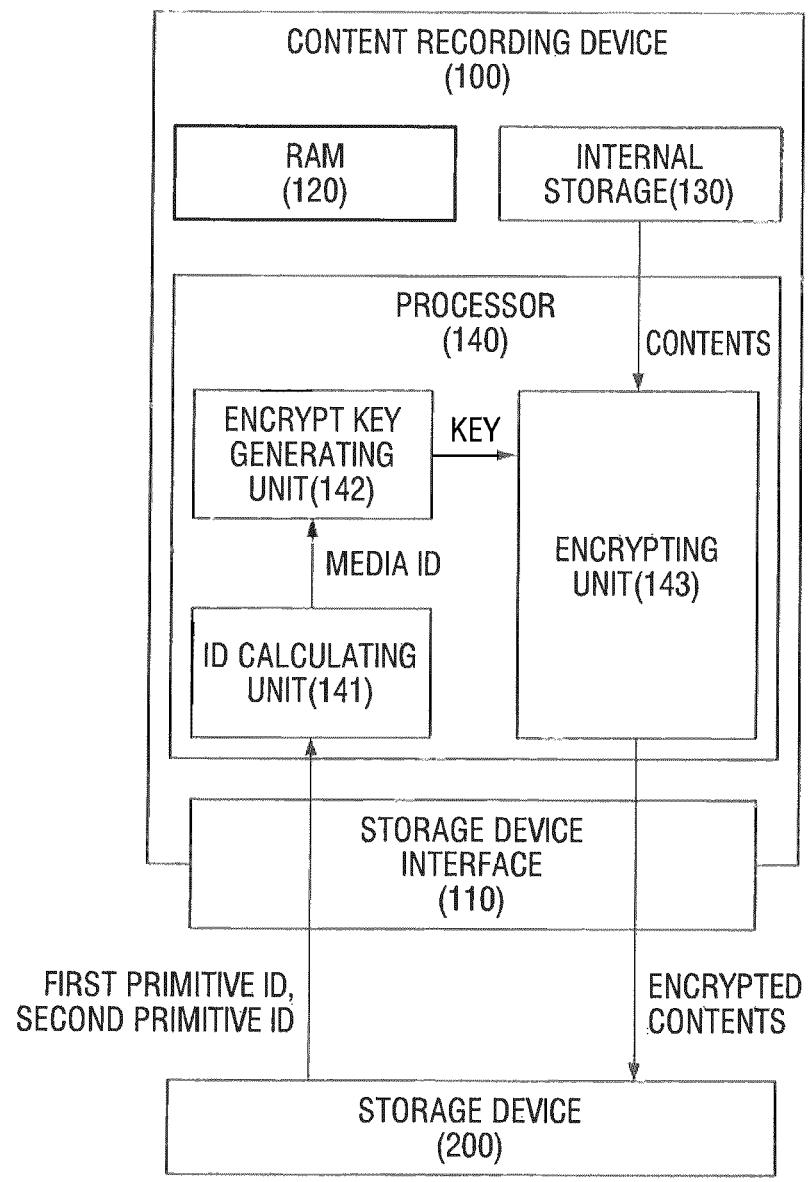
FIGS. 2 to 4 are block diagrams illustrating a content recording device according to an embodiment of the present general inventive concept.

FIG. 2 is a block diagram illustrating a content recording device usable as the content recording device 100 of the content encryption/decryption system 10 of FIG. 1 according to an embodiment of the present general inventive concept. As illustrated in FIG. 2, the content recording device 100 may include a processor 140 and a storage device interface 110. The content recording device 100 may further include a random access memory (RAM) 120 that temporarily stores a set of commands to be executed by the processor 140, and an internal storage 130.

The storage device interface 110 performs data transmission and reception between the content recording device 100 and the storage device 200. The storage device interface 110 receives the first primitive ID and the second primitive ID to identify first and second portions provided in the storage device 200 from the storage device 200, and provides the content encrypted by the processor 140 to the storage device 200. The first primitive ID may be a controller ID that is a unique ID of a controller provided in the storage device, and the second primitive ID may be an encrypted memory ID that is a unique ID of a memory device provided in the storage device. The first and second portions of the storage device 200 may be portions corresponding to a memory and a controller of the storage device 200. However, the present general inventive concept is not limited thereto. The first and second portions may correspond to any portion to correspond to a memory portion to store data and a control portion to control the memory portion and/or to communicate with an external device.

The processor 140 executes commands temporarily stored in the RAM 120 and the executed commands may be grouped into an ID calculating unit 141, an encryption key generating unit 142 and an encrypting unit 143 according to functions.

The ID calculating unit 141 obtains the memory ID by decrypting the encrypted memory ID, generates a memory derived ID that is another unique ID of the memory device and is used in generating the media ID using the memory ID, and calculates the media ID using at least one of the controller ID and the memory derived ID. For example, the ID calculating unit 141 may calculate the media ID by performing a binary operation on the controller ID and the memory derived ID or by performing string concatenation on the controller ID and the memory derived ID. In the string concatenation, the memory derived ID may be connected after the controller ID or the controller ID may be connected after the memory derived ID.

The encryption key generating unit 142 generates the encryption key using the media ID, and the encrypting unit 143 encrypts the content based on the encryption key. The content may be content stored in the internal storage 130 or in the storage device 200. The encryption key generating unit 142 may set the media ID in a predetermined routine having an input parameter and an output as the input parameter, execute the routine and provide result data as the output to the encrypting unit 143 as the encryption key. The routine may be a one-way function.

Figure 3:
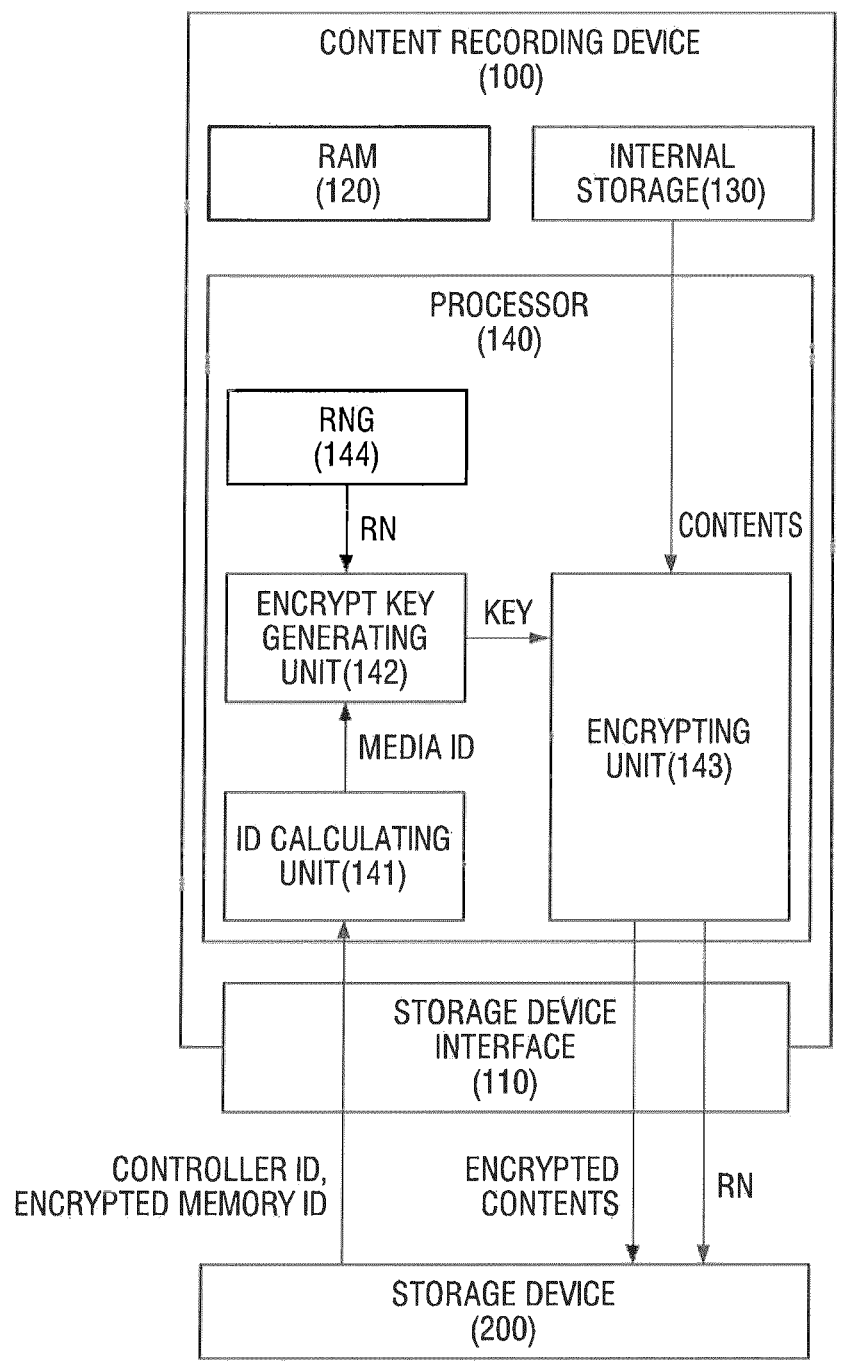

FIG. 3 is a block diagram illustrating a content recording device usable as the content recording device 100 of the content encryption/decryption system 10 of FIG. 1 according to an embodiment of the present general inventive concept.

As illustrated in FIG. 3, the processor 140 may further include a random number generator (RNG) 144. The random number generator 144 may generate a random number and provide the same to the encryption key generating unit 142.

Figure 10:
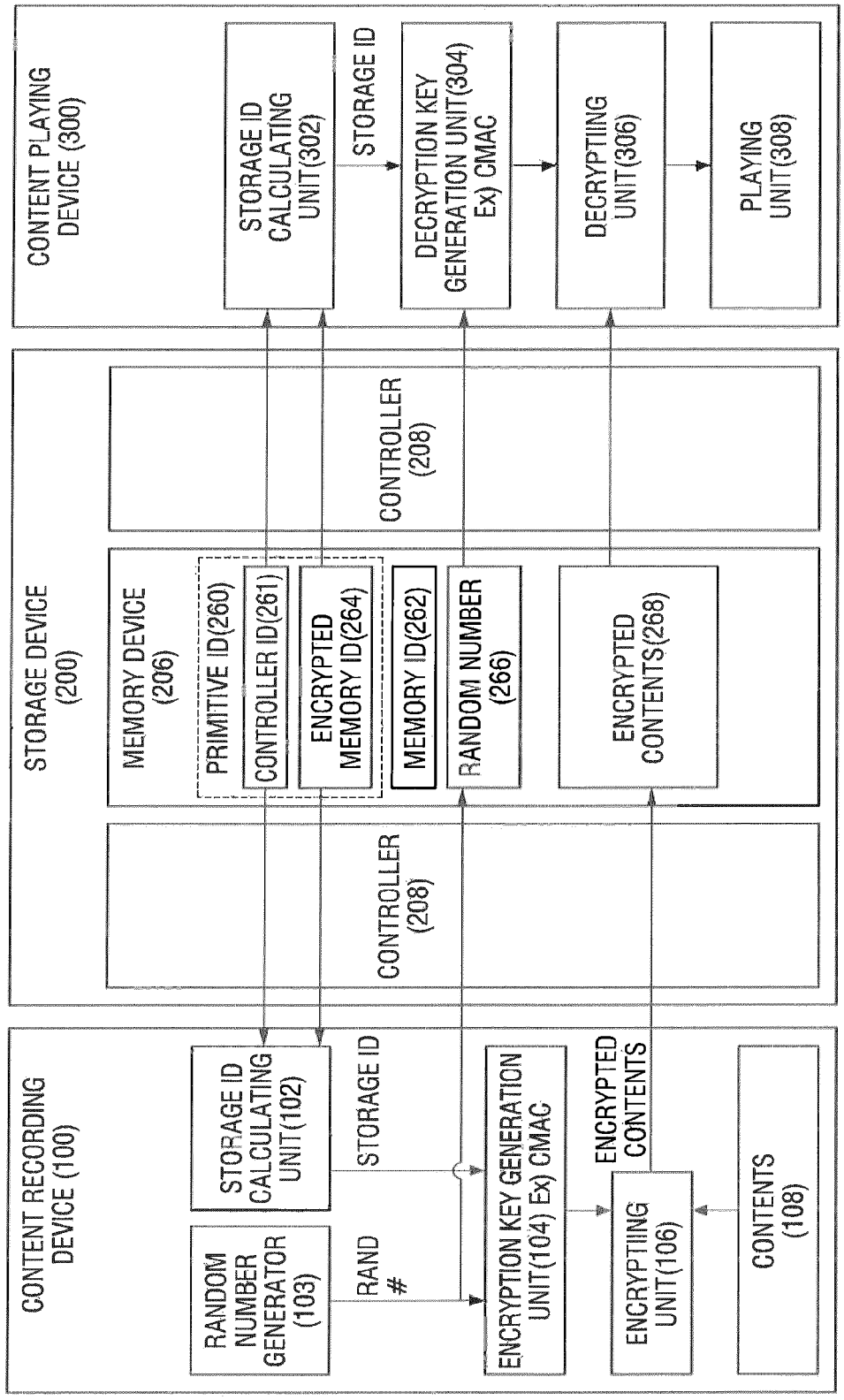

The encryption key generating unit 142 may generate the encryption key using the media ID generated by the ID generating unit 141 and the random number received from the random number generator 144. For example, the encryption key generating unit 142 may generate the encryption key by inputting the unique ID and the random number into an algorithm, for example, a cipher-based message authentication code (CMAC) algorithm. Since the random number is also required in generating a decryption key to decrypt one or more encrypted contents, the random number and the encrypted content may be stored in the storage device 200, which will later be described in more detail with reference to FIG. 10 illustrating an embodiment of the encryption key generating unit 142 to generate the encryption key using the media ID and the content unique ID.

Figure 11:
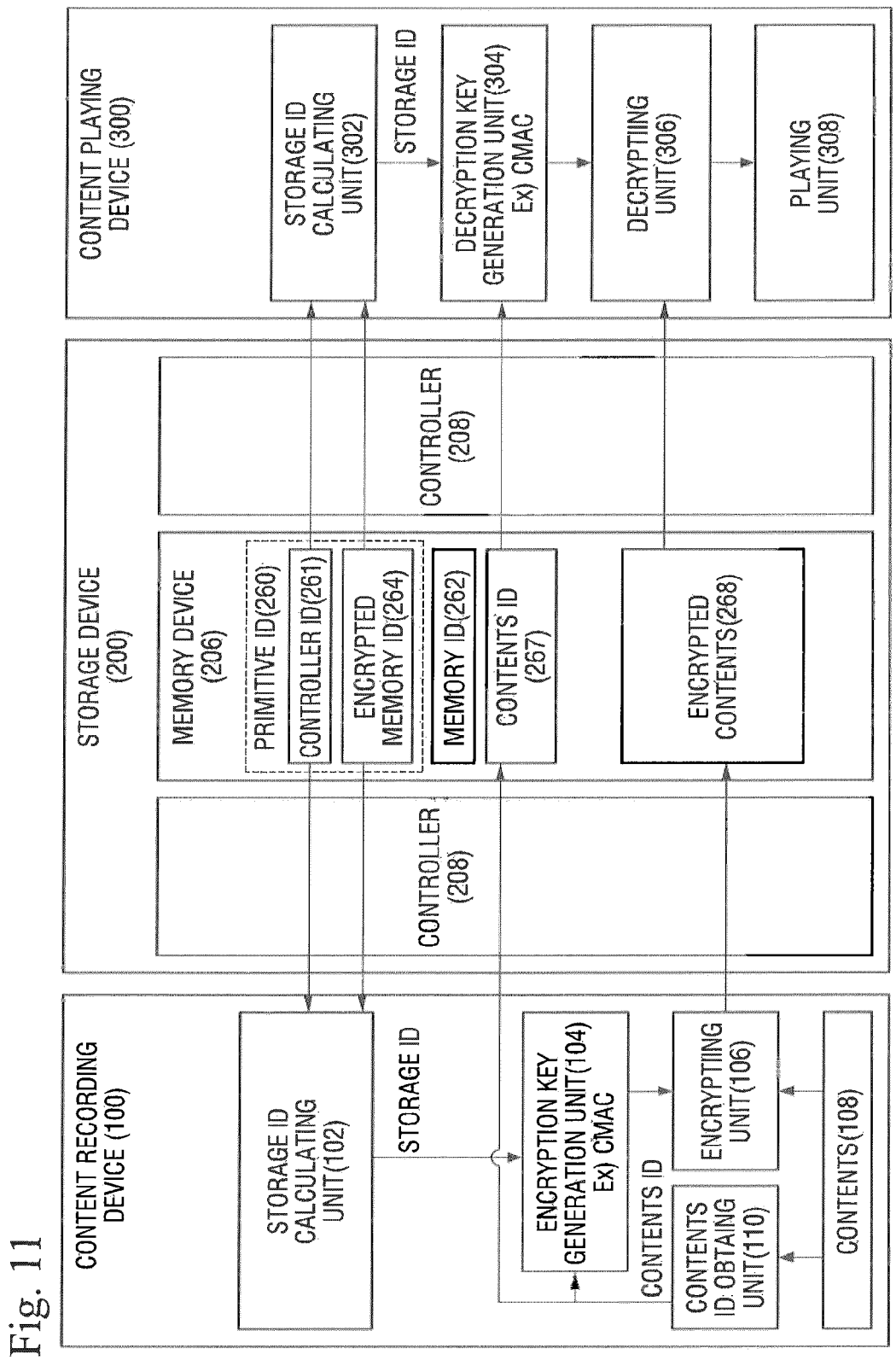

The encryption key generating unit 142 may generate the encryption key using the media ID and the content unique ID. Like the random number, the content unique ID is also required in generating the decryption key to decrypt the encrypted content. Thus, the content unique ID may be stored in the storage device 200 together with the encrypted content, which will later be described in more detail with reference to FIG. 11 illustrating an embodiment of the encryption key generating unit 142 to generate the encryption key using the media ID and the content unique ID.

Figure 4:
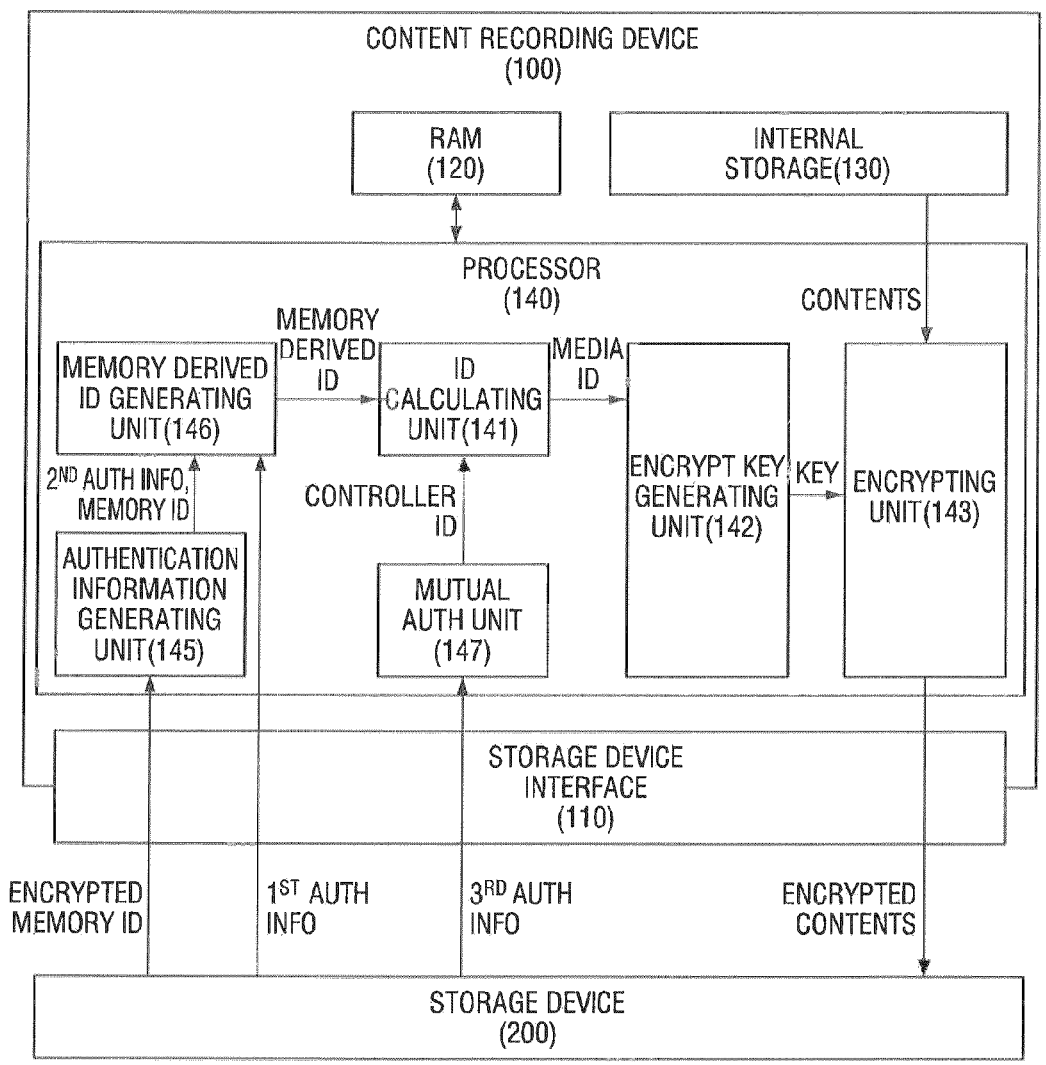

FIG. 4 is a block diagram illustrating a content recording device usable as the content recording device 100 of the content encryption/decryption system 10 of FIG. 1 according to an embodiment of the present general inventive concept.

As illustrated in FIG. 4, the content recording device 100 according to an embodiment of the present general inventive concept may include a processor 140 and a storage device interface 110. The processor 140 may include an ID calculating unit 141, an encryption key generating unit 142 and an encrypting unit 143 and may further include an authentication information generating unit 145, a memory derived ID generating unit 146 and a mutual authentication unit 147.

Figure 5:
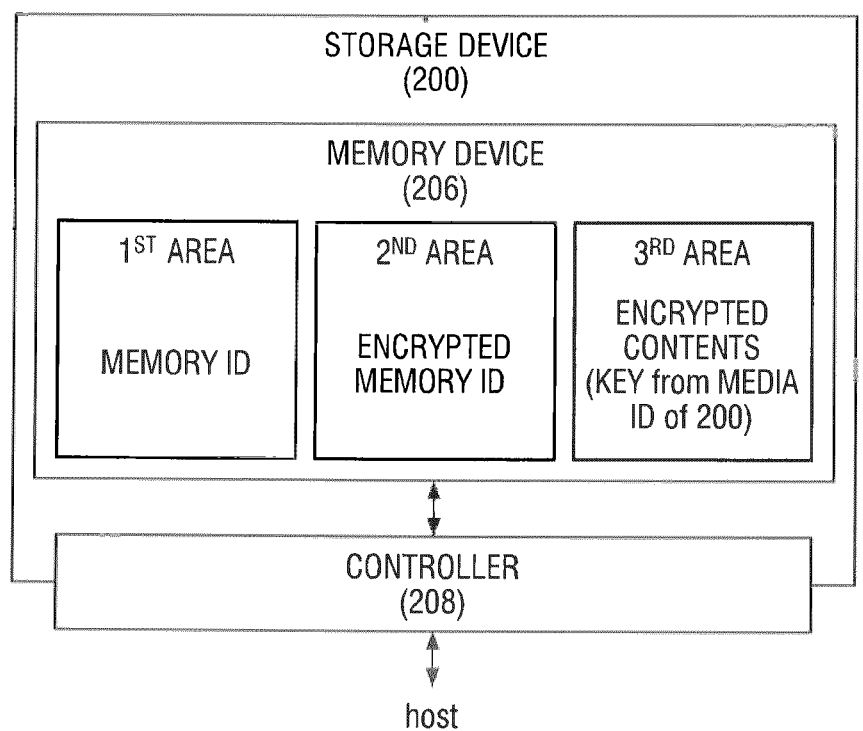
FIG. 5 is a block diagram illustrating a storage device according to an embodiment of the present general inventive concept.

The content recording device 100 according to an embodiment of the present general inventive concept performs a plurality of authentications, for example, mutual authentication two times with the storage device 200, that is, first authentication and second authentication. The first authentication is performed to authenticate a memory device of the storage device 200, for example, a memory device 206 of the storage device 200 (FIG. 5), and the second authentication is performed to authenticate a controller of the storage device 200, for example, a controller 208 of the storage device 200 (FIG. 5).

The first authentication is performed such that the memory derived ID generating unit 146 receives first authentication information from the storage device 200 and second authentication information from the authentication information generating unit 145 and compares the first authentication information and the second authentication information with each other. As the comparison result, only if the first authentication information is identical with the second authentication information, the memory derived ID generating unit 146 generates a memory derived ID using a memory ID corresponding to the second authentication information. The memory derived ID generating unit 146 receives the memory ID from the authentication information generating unit 145 as the second authentication information. The authentication information generating unit 145 generates the memory ID by decrypting an encrypted memory ID received from the storage device 200 and then provides the same to the memory derived ID generating unit 146 as the second authentication information. The memory derived ID generated by the memory derived ID generating unit 146 is provided to the ID calculating unit 141.

The second authentication is performed by the mutual authentication unit 147. The mutual authentication unit 147 receives third authentication information from the storage device 200 in order to perform the second authentication. The second authentication may be mutual authentication based on a public key. The third authentication information may include authentication certificate data of the storage device 200 and a controller primitive ID that is a unique ID of the controller provided in the storage device 200. The mutual authentication unit 147 may obtain a controller ID that is another unique ID of the controller using an authentication certificate ID included in the authentication certificate data and the controller primitive ID. For example, the mutual authentication unit 147 may obtain the controller ID by performing string concatenation on the authentication certificate ID and the controller primitive ID.

The mutual authentication unit 147 exchanges authentication certificates with the storage device 200 in order to perform public key based mutual authentication between the content recording device 100 and the storage device 200. In an operation of performing the public key based mutual authentication, the controller ID is obtained from the third authentication information received from the storage device 200. The mutual authentication unit 147 provides the controller ID to the ID calculating unit 141. As described above, the ID calculating unit 141 may calculate the media ID using at least one of the controller ID and the memory derived ID. The encryption key generating unit 142 generates the encryption key using the media ID, and the encrypting unit 143 encrypts content using the encryption key to then provide the encrypted content to the storage device 200.

FIG. 5 is a block diagram illustrating a storage device usable as the storage device 200 of the content encryption/decryption system 10 of FIG. 1 according to an embodiment of the present general inventive concept.

As illustrated in FIG. 5, the storage device 200 according to an embodiment of the present general inventive concept may include a memory device 206 and a controller 208 controlling the memory device 206.

The memory device 206 may be a semiconductor chip or package using a nonvolatile memory, a NAND-flash memory, NOR-flash memory, a phase change random access memory (PRAM), a magnetic random access memory (MRAM), a resistive random access memory (RRAM) as storage means.

In addition, the memory device 206 may be mounted in various types of packages. Examples of the packages of the memory device 206 include Package on Package (PoP), Ball Grid Arrays (BGAs), Chip Scale Packages (CSPs), Plastic Leaded Chip Carrier (PLCC), Plastic Dual In-line Package (PDIP), Die in Waffle Pack, Die in Wafer Form, Chip On Board (COB), Ceramic Dual In-line Package (CERDIP), Plastic Metric Quad Flat Pack (MQFP), Thin Quad Flat Pack (TQFP), Small Outline Integrated Circuit (SOIC), Shrink Small Outline Package (SSOP), Thin Small Outline Package (TSOP), System In Package (SIP), Multi Chip Package (MCP), Wafer-level Fabricated Package (WFP), and Wafer-level Processed Stack Package (WSP).

The memory device 206 stores one or more encrypted contents and a primitive ID. The encrypted content is data to be decrypted with a decryption key generated using a media ID, and the primitive ID is one or more identifying data used in calculating the media ID and is different from the media ID. The primitive ID includes a controller ID that is a unique ID of the controller 208 and an encrypted memory ID that is a unique ID of the memory device 206.

The media ID is a unique ID of the storage device 200 including the memory device 206 and the controller 208, and is generated using a memory derived ID generated using the memory ID and the controller ID.

The memory device 206 may have a storage area divided into a first area, a second area and a third area.

The memory device 206 may store the memory ID in the first area, the controller ID and the encrypted memory ID in the second area, and the encrypted content in the third area, respectively.

The first area is an area that is not accessed by an accessing method for the third area. For example, the third area is a read/write accessible area, and the first area may be an area accessible only by a security logic (not shown) incorporated into the memory device 206. In addition, the second area may be an read-only accessible area. The security logic may output the encrypted memory ID stored in the second area through the controller 208 in response to a read request for the memory ID.

As described above in FIGS. 3 and 5, the memory device 206 may further store one of a random number used in generating the decryption key and the content ID.

In order to prevent the decryption key from being copied together with the encrypted content, it is preferable for the memory device 206 not to store the decryption key itself. That is to say, a device for playing the encrypted content stored in the storage device 200 according to the present invention should directly generate the decryption key for the encrypted content using the media ID after receiving the primitive ID from the storage device 200 and generating the media ID. The storage device 200 may communicate with a host, such as the content recording device 100 and/or the content playing device 300.

Figure 6:
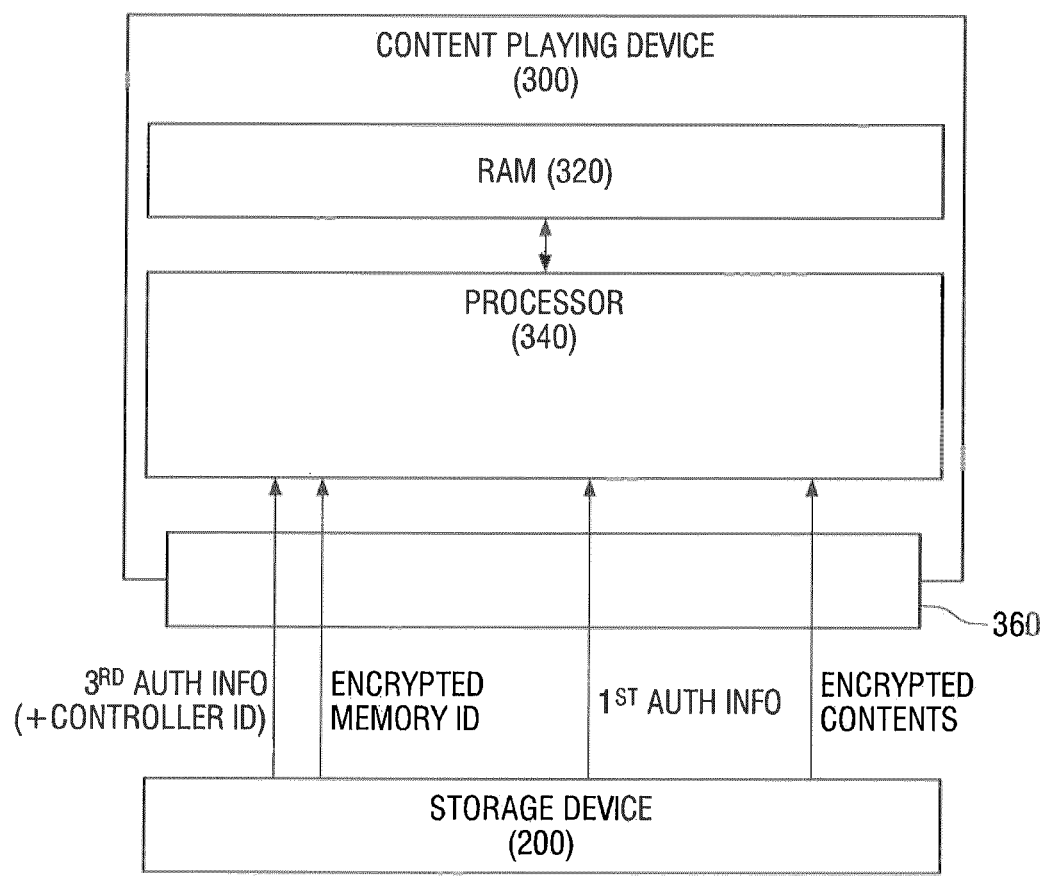
FIG. 6 is a block diagram illustrating a content playing device according to an embodiment of the present general inventive concept.

FIG. 6 is a block diagram illustrating a content playing device usable as the content playing device 300 of the content encryption/decryption system 10 of FIG. 1 according to an embodiment of the present general inventive concept. As illustrated in FIG. 6, the content playing device 300 according to an embodiment of the present general inventive concept may include a processor 340 and a storage device interface 360. The processor 340 may further include a random access memory (RAM) 320 that temporarily stores a set of commands to be executed.

The storage device interface 360 may receive a first primitive ID and a second primitive ID for identifying the encrypted content stored in the storage device 200 and first and second portions provided in the storage device 200 from the storage device 200.

The processor 340 generates a media ID that is a unique ID of the storage device 200 using the first primitive ID and the second primitive ID, decrypts the encrypted content with a decryption key generated using the media ID, and plays the decrypted content. The playing the decrypted content may include outputting a data signal corresponding to the decrypted content or outputting a video and/or audio signal such that an image and/or sound is generated through an output unit, for example, a display and/or speaker.

The second primitive ID may be an encrypted memory ID that is a unique ID of a memory device provided in the storage device. The processor 340 may generate second authentication information for performing first authentication between the content playing device 300 and the storage device 100 using the encrypted memory ID. The processor 340 generates the memory ID by decrypting the encrypted memory ID and may generate the second authentication information based on the memory ID.

As described above, the first authentication is performed to authenticate the memory device 206 of the storage device 100. The storage device interface 360 further receives first authentication information to perform the first authentication from the storage device 200 to then provide the same to the processor 340. The processor 340 compares the first authentication information with the second authentication information and generates the media ID only when the first authentication information and the second authentication information are identical with each other.

The first primitive ID may be a controller ID that is a unique ID of a controller 208 provided in the storage device 200. The storage device interface 360 receives third authentication information to perform second authentication between the content playing device 300 and the storage device 200 from the storage device 200. Here, the third authentication information includes the controller ID.

The storage device interface 360 may further receive a random number stored in the storage device 200 from the storage device 200 and may provide the received random number to the processor 340. The processor 340 may generate a decryption key by inputting the media ID and the random number into a CMAC algorithm. The storage device interface 360 may further receive a content ID stored in the storage device 200 from the storage device 200 and may provide the received random number to the processor 340. The processor 340 may generate the decryption key by inputting the media ID and the content ID into the CMAC algorithm.

The configuration and operation of a content storing server 400 according to an embodiment of the present general inventive concept will be described with reference to FIGS. 7 and 8. The content storing server 400 according to an embodiment of the present invention may be a server that provides a cloud service. That is to say, the content storing server 400 may be a server that supports a plurality of terminals owned by a particular user to automatically synchronize one or more contents. The content storing server 400 may be a combination of at least two of the content recording device 100, storage device 200, and content playing device 300.

For example, when a first terminal 502 and a second terminal 504 belong to a terminal group 500, the first terminal 502 generates new content and the generated new content is uploaded on the content storing server 400, the content storing server 400 may support the synchronization to be automatically performed by transmitting the uploaded content to the second terminal 504.

The content storing server 400 supports the synchronization to be automatically performed without user's manipulation. However, according to an embodiment of the present general inventive concept, the synchronization may be manually performed by user's manipulation. For example, at least one of uploading and downloading of content may be performed by user's command or confirmation input to the content storing server 400 through a user input unit provided thereon.

Hereinafter, the configuration and operation of the content storing server 400 according to an embodiment of the present general inventive concept will be described. In FIGS. 7 and 8, a first terminal 502 and a second terminal 504 belong to one terminal group 500. For example, the first terminal 502 and the second terminal 504 may be owned by one user. The first terminal 502 and the second terminal 504 may be, for example, mobile communication terminals. The storage device 522 may be any type of a memory card incorporating a flash memory, for example, such as a PC card (PCMCIA, personal computer memory card international association), a compact flash (CF) card, a smart media card (SM), a memory stick, a multimedia card (MMC, RS-MMC or MMCmicro), a secure digital card (SD, miniSD, microSD, SDHC), a universal flash storage (UFS) card, and the like.

Figure 7:
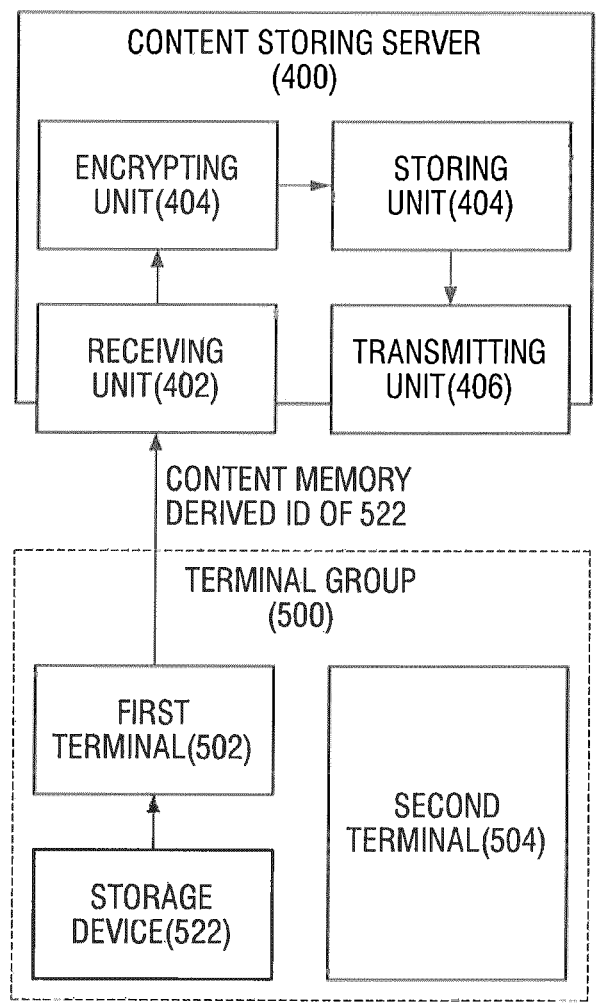
FIGS. 7 and 8 are block diagrams illustrating a content storing server according to an embodiment of the present general inventive concept.
Figure 8:
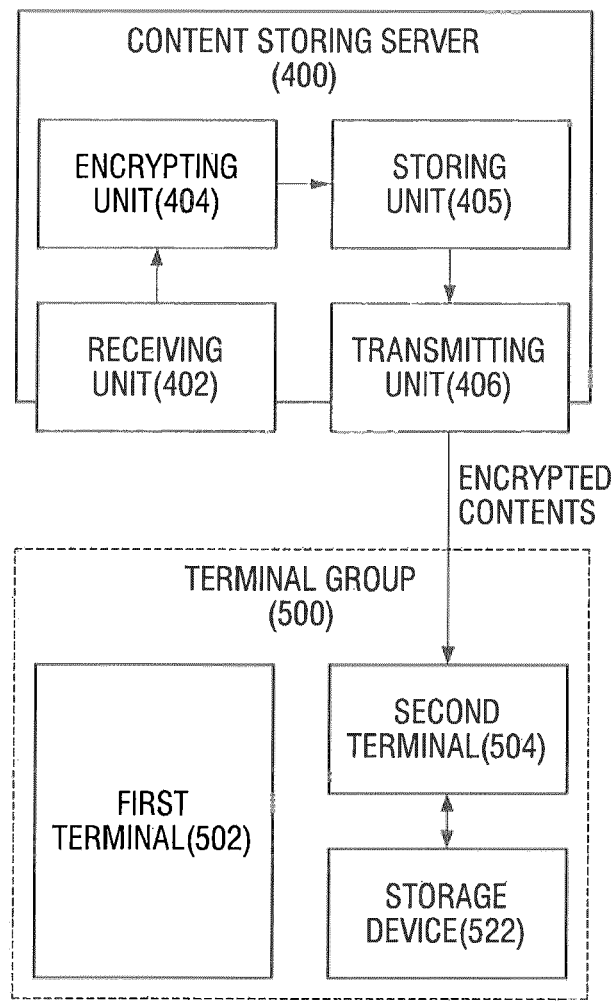

FIG. 7 illustrates an operation of the content storing server 400 when content are uploaded. The content to be uploaded may be generated by the first terminal 502 or may be stored in the storage device 522 connected to the first terminal 502.

The first terminal 502 generates a memory derived ID and uploads the content to be uploaded and the memory derived ID on the content storing server 400. The memory derived ID may be uploaded in an encrypted format to be prevented from being leaked.

A receiving unit 402 of the content storing server 400 receives the content and the memory derived ID to then provide the same to the encrypting unit 404. The encrypting unit 404 encrypts the content using the memory derived ID as an encryption key. The encrypting unit 404 may use symmetric encryption algorithm to allow the memory derived ID to be used as a decryption key as well. The original content are preferably deleted once encryption is completed by the encrypting unit 404.

The content encrypted by the encrypting unit 404 may be stored in a storing unit 405. According to an embodiment of the present general inventive concept, the storing unit 405 may be provided in a separate server (not illustrated) different from the content storing server 400.

The operation associated with the second terminal 504 to download the encrypted content will be described with reference to FIG. 8. The transmitting unit 406 transmits the encrypted content stored in the storing unit 405 to the second terminal 504. The transmitting may be automatically performed without manipulating the second terminal 504 or may be performed after the user is verified by the second terminal 504. The transmitting may be performed for the purpose of synchronizing the content between the first terminal 502 and the second terminal 504. Therefore, if the same content has been pre-stored in the second terminal 504, the transmitting may not be performed.

As described above, the second terminal 504 may download only the encrypted content from the content storing server 400. Therefore, in order for the second terminal 504 to generate a decryption key, the storage device 522 connected to the first terminal 502 when the first terminal 502 uploads the content is connected to the second terminal 504. The second terminal 504 receives the encrypted memory ID from the storage device 522 and performs the first authentication, thereby generating the memory derived ID and decrypting the encrypted content downloaded from the content storing server 400 using the memory derived ID.

The second terminal 504 may generate the memory derived ID and perform decryption at the time when the user inputs a play command of the downloaded encrypted content. However, even if there is no play command, the generating of the memory derived ID and the decrypting may be performed at a time when the downloading is completed.

According to an embodiment of the present general inventive concept, the content storing server 400 may transmit the decrypted content to the second terminal 504. That is to say, the content storing server 400 may further include a decrypting unit (not illustrated) to decrypt the encrypted content using the memory derived ID received from the first terminal 502, transmits the decrypted content to the transmitting unit 406 and then deletes the same.

In the embodiment of the present general inventive concept, the content storing server 400 may store the memory derived ID in a secured area of the storing unit 405, thereby preventing the memory derived ID from being leaked.

According to an embodiment of the present general inventive concept, the content storing server 400 may encrypt the uploaded content using an encryption key different from the memory derived ID based on the memory derived ID. Here, the encrypting unit 404 may generate the encryption key different from the memory derived ID based on the memory derived ID, and the transmitting unit 406 may transmit the encrypted content and a decryption key of the encrypted content to the second terminal 504.

The content storing server 400 according to the embodiment of the present general inventive concept encrypts the uploaded content using the memory derived ID of the storage device 522 connected to the content upload terminal 502 and stores only the encrypted content. The memory derived ID is generated based on a memory ID that is a unique ID of a memory device provided in the storage device 522.

A conventional cloud service undergoes user verification to access the uploaded content. However, if the user verification is nullified, there is a risk that content associated with user's personal information can be leaked.

However, the content storing server 400 according to the embodiment of the present general inventive concept encrypts the uploaded content and then stores the encrypted content, and the encryption key is generated using the memory derived ID of the storage device 522 connected to the content upload terminal 502. The content storing server 400 does not store the encryption key. Since the encryption key and the decryption key are equal to each other, a content download terminal may generate the decryption key of the encrypted content for itself. That is, if a storage device connected to the content upload terminal 502 is not provided, decryption of content may not be performed.

Even if the user verification is nullified, in order to obtain a decryption key of each of the content, the memory derived ID should be known. In order to obtain information on the memory derived ID, the content storing server 400 may be connected to the storage device connected to the content upload terminal 502 according to a wired or wireless communication method. Therefore, according to the embodiment of the present general inventive concept, the security of the content uploaded on the cloud server can be enhanced. For example, the content associated with personal private information can be safely synchronized using the cloud service.

Configurations and operations of a content recording device, a storage device and a content playing device according to embodiments of the present general inventive concept will be described with reference to FIGS. 9 to 15.

Figure 9:
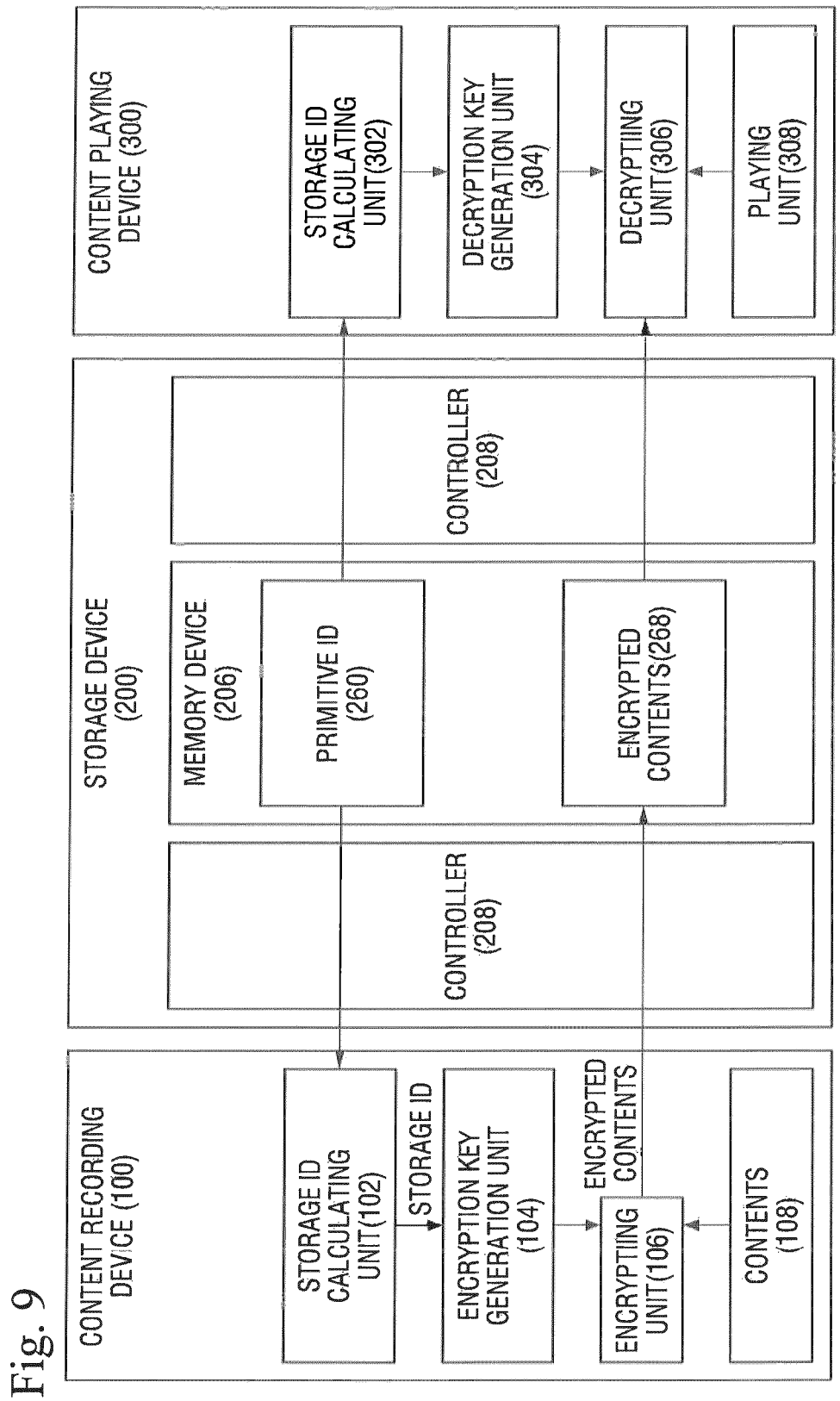
FIGS. 9 to 14 are block diagrams illustrating a method of a content encryption/decryption system according to an embodiment of the present general inventive concept.

FIG. 9 illustrates a content recording device 100, a storage device 200 and a content playing device 300 according to an embodiment of the present general inventive concept.

As illustrated in FIG. 9, the content recording device 100 according to an embodiment of the present general inventive concept receives a primitive ID stored in the storage device 200 from the storage device 200, and includes a storage device ID calculating unit 102 to calculate a media ID that is a unique ID of the storage device 200 from the primitive ID, an encryption key generating unit 104 to generate a content encryption key using the media ID, an encrypting unit 106 to generate encrypted content by encrypting content 108 using the content encryption key, and a storage device controller (not illustrated) that controls the storage device 200 to store the encrypted content therein.

The storage device 200 may include a memory device 206 and a memory device controller 208 to control the memory device 206 according to a command of the storage device 200. The memory device 206 may store a primitive ID 260 and encrypted content 268.

The content playing device 300 receives the primitive ID stored in the storage device 200 from the storage device 200, and includes a storage device ID calculating unit 302 to calculate a media ID of the storage device 200 from the primitive ID, a controller (not illustrated) to control the storage device to output the encrypted content 268 stored in the storage device 200, a decryption key generating unit 304 to generate a content decryption key using the media ID, and a decrypting unit 306 to decrypt the encrypted content 268 output from storage device 200 using the content decryption key. In addition, the content playing device 300 may further include a playing unit 308 to play the decrypted content.

FIG. 10 illustrates a content recording device 100, a storage device 200 and a content playing device 300 according to an embodiment of the present general inventive concept. The content recording device 100, storage device 200 and content playing device 300 of FIG. 10 is similar to the content recording device 100, storage device 200 and content playing device 300 of FIG. 9. Accordingly, detailed descriptions thereof will be omitted. Since the storage device 200 according to the embodiment of the present general inventive concept may further include a random data unit to store a random data or number (or character) 266, differences in structures and operations of the content recording device 100, the storage device 200 and the content playing device 300 of FIG. 9 and corresponding components of FIG. 10 will be explained hereinafter.

The storage device 200 according to the embodiment of the present general inventive concept may store a primitive ID 260, a memory ID 262, a random data (or random number) 266 and encrypted content 268 in a memory device 206. The memory ID 262 may not be read by an accessing method for a user area in which the encrypted content 268 are stored.

The primitive ID 260 may include a controller ID 261 and an encrypted memory ID 264. The encrypted memory ID 264 is an ID obtained by encrypting the memory ID 262 that is a unique ID of the memory device 206.

The content recording device 100 according to the embodiment of the present general inventive concept may further include a random number generator 103. The encryption key generating unit 104 may generate an encryption key using the media ID generated by the storage device ID calculating unit 102 and the random number generated by the random number generator 103. The encryption key generating unit 104 may generate the content encryption key from data obtained by inputting the media ID and the random number into a cipher-based message authentication code (CMAC) algorithm, for example. The random number generated by the random number generator 103 may be transmitted to or stored in the random data unit of the storage device 200 as the random number 266.

The content playing device 300 according to the embodiment of the present general inventive concept may receive the random number 266 stored in the random data unit of the storage device 200 and may include a decryption key generating unit 304 to generate a content decryption key using the media ID calculated by the storage device ID calculating unit 302 and the random number 266. For example, the decryption key generating unit 304 may use the data obtained by inputting the media ID and the random number 266 into the CMAC algorithm as the content decryption key.

FIG. 11 illustrates a content recording device 100 and a content playing device 300 according to an embodiment of the present general inventive concept. The content recording device 100, storage device 200 and content playing device 300 of FIG. 11 is similar to the content recording device 100, storage device 200 and content playing device 300 of FIG. 9. Accordingly, detailed descriptions thereof will be omitted. Referring to FIG. 11, Since the content recording device 100 generates an encryption key using a content identifier (ID) 267 instead of the random number 266 of FIG. 10 and the content playing device 300 generates a decryption key using the content ID 267, differences in structures and operations of the content recording device 100, the storage device 200 and the content playing device 300 of FIG. 9 and corresponding components of FIG. 11 will be explained hereinafter.

As illustrated in FIG. 11, the content recording device 100 according to the embodiment of the present general inventive concept may further include a content ID obtaining unit 110 to obtain an ID of one or more contents 108. The content ID obtaining unit 110 may obtain the content ID included in a header of the content 108, may generate information to identify the content 108 from the content 108, and may receive the content ID of the content 108 from a content ID providing server (not illustrated). The content ID obtaining unit 110 provides the content ID to the encryption key generating unit 104 and then to the storage device 200.

The content recording device 100 according to the embodiment of the present general inventive concept may include an encryption key generating unit 104 to generate an encryption key using the content ID and the media ID such that the encryption unit 106 can encrypt the one or more contents and transmit the encrypted contents to the storage device 200.

The storage device 200 according to the embodiment of the present general inventive concept stores the content ID 267 provided from the content recording device 100.

The content playing device 300 according to the embodiment of the present general inventive concept may receive the content ID 267 stored in the storage device 200 and may include a decryption key generating unit 304 to generate a decryption key using the media ID (storage ID) and the content ID 267 such that the decrypting unit 306 can decrypt the one or more encrypted contents.

Meanwhile, the content recording device 100 according to the embodiment of the present general inventive concept may not store the content ID 267 in the storage device 200. In this case, after generating the information to identify the encrypted content, the content playing device 300 may receive the content ID of the content 108 from the content ID providing server (not illustrated) by referring to the identifying information.

Figure 12:
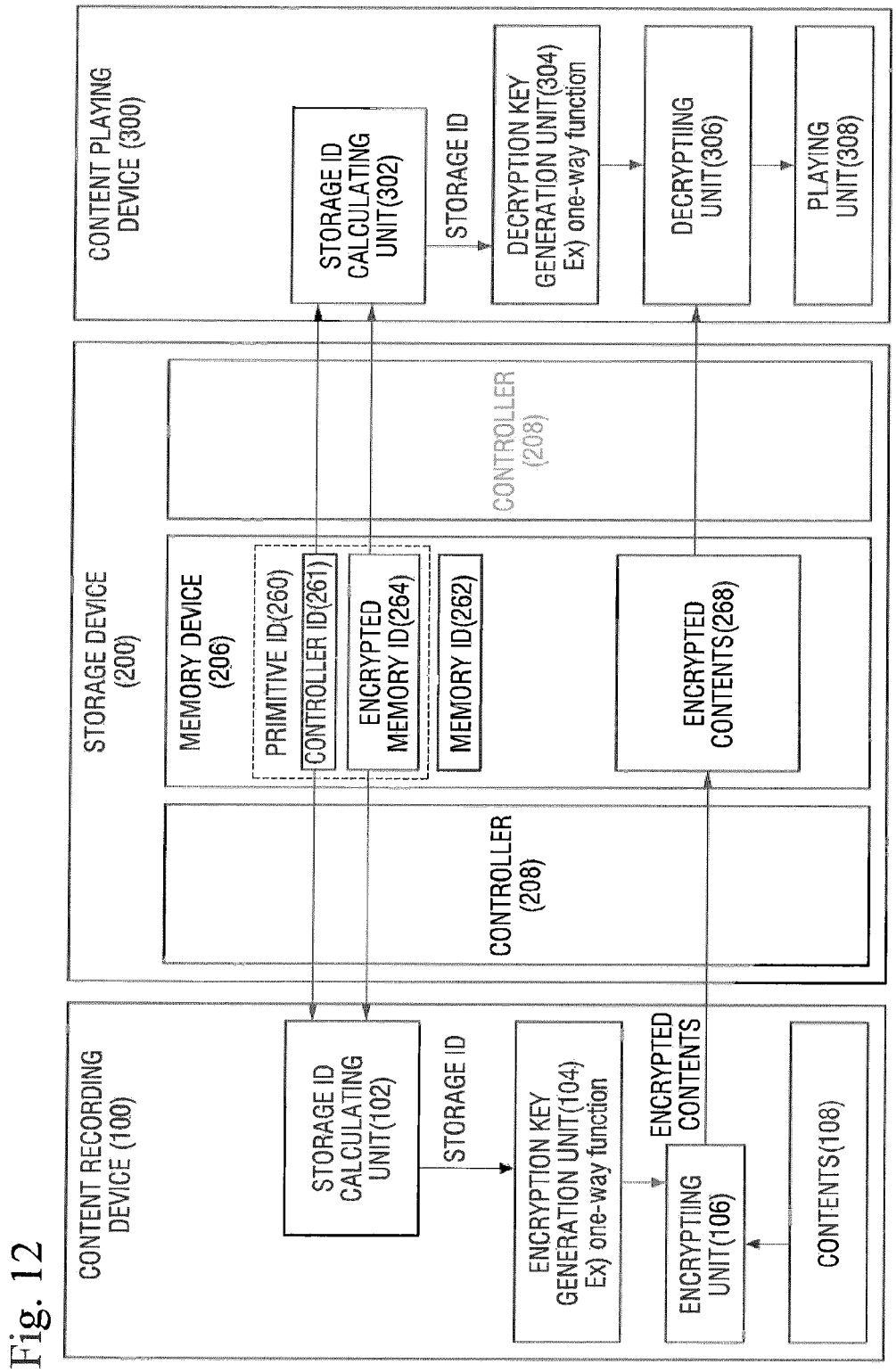

FIG. 12 illustrates a content recording device 100, a storage device 200 and a content playing device 300 according to an embodiment of the present general inventive concept. The content recording device 100, storage device 200 and content playing device 300 of FIG. 12 is similar to the content recording device 100, storage device 200 and content playing device 300 of FIG. 9. Accordingly, detailed descriptions thereof will be omitted. Referring to FIG. 11. The differences in structures and operations of the content recording device 100, the storage device 200 and the content playing device 300 of FIG. 9 and corresponding components of FIG. 12 will be explained hereinafter.

As illustrated in FIG. 12, in generating an encryption key and a decryption key, a media ID is input to a predetermined function and data output of the function may be generated as the encryption key or the decryption key. The predetermined function may be, for example, a one-way function.

That is, the encryption key generating unit 104 and the decryption key generating unit 304 of FIG. 12 may not require a random number 266, a password or a content ID 267 in generating the encryption key and the decryption key.

Figure 13:
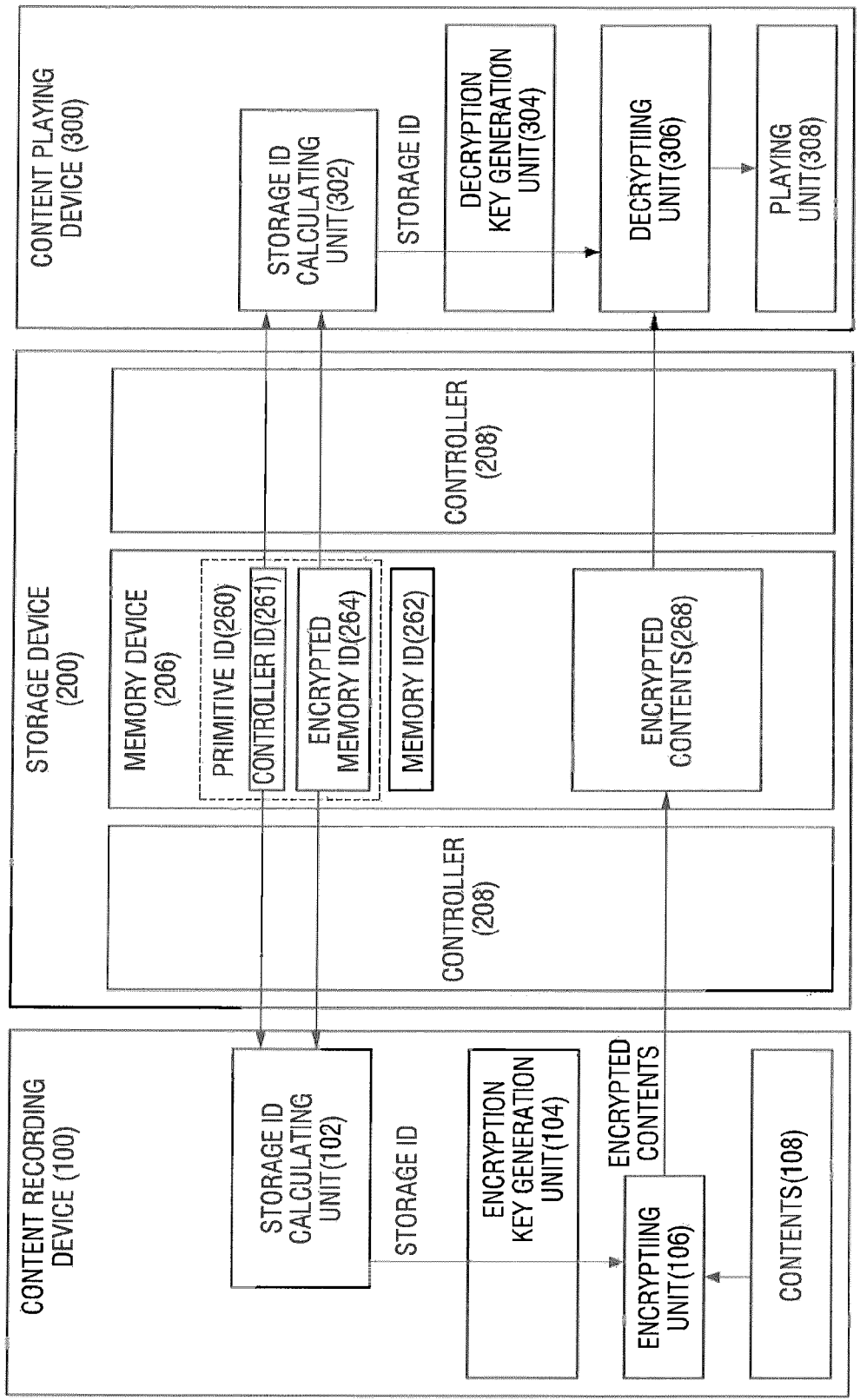

FIG. 13 illustrates a content recording device 100, a storage device 200 and a content playing device 300 according to an embodiment of the present general inventive concept. The content recording device 100, storage device 200 and content playing device 300 of FIG. 13 is similar to the content recording device 100, storage device 200 and content playing device 300 of FIG. 9. Accordingly, detailed descriptions thereof will be omitted. The differences in structures and operations of the content recording device 100, the storage device 200 and the content playing device 300 of FIG. 9 and corresponding components of FIG. 13 will be explained hereinafter.

Referring to FIG. 13, when the content recording device 100 and the content playing device 300 generate an encryption key and a decryption key, respectively, a media ID is used as the encryption key or the decryption key as it is. Therefore, as illustrated in FIG. 13, an encryption key generating unit 104 of the content recording device 100 and a decryption key generating unit 304 of the content playing device 300 may output the input media ID as the encryption key or the decryption key as it is without performing any particular operations.

Figure 14:
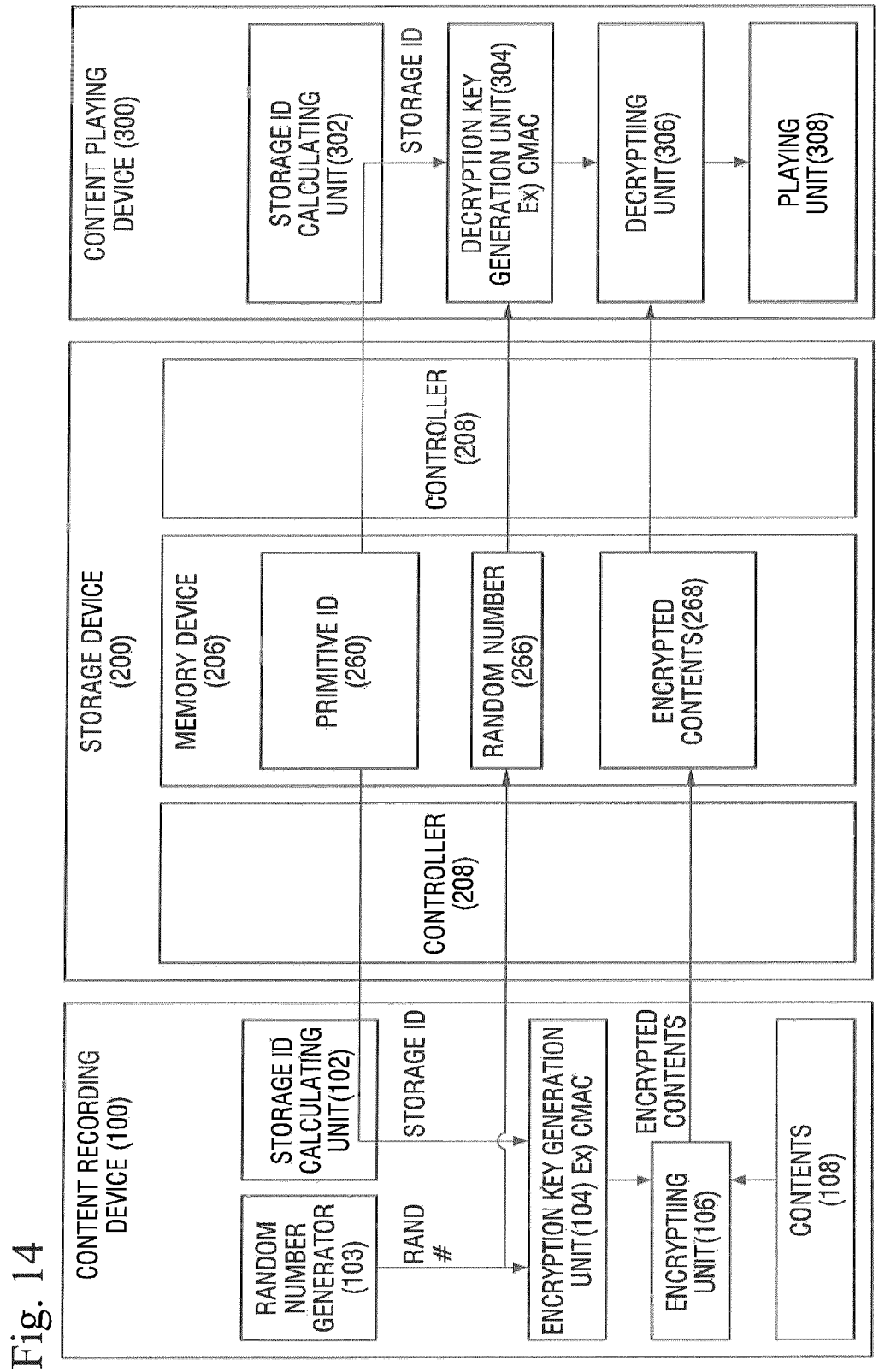

FIG. 14 illustrates a content recording device 100, a storage device 200 and a content playing device 300 according to an embodiment of the present general inventive concept. The content recording device 100, storage device 200 and content playing device 300 of FIG. 14 is similar to the content recording device 100, storage device 200 and content playing device 300 of FIG. 10. Accordingly, detailed descriptions thereof will be omitted. The differences in structures and operations of the content recording device 100, the storage device 200 and the content playing device 300 of FIG. 10 and corresponding components of FIG. 14 will be explained hereinafter.

Referring to FIG. 14, in obtaining a media ID, a primitive ID 260 derived from the media ID is used as the media ID as it is. Therefore, as illustrated in FIG. 14, a storage device ID calculating unit 102 of the content recording device 100 and a storage device ID calculating unit 302 of the content playing device 300 may output the input primitive ID as the media ID as it is without performing any particular operations.

Each of the components illustrated in FIGS. 1 to 14 may be implemented as a software program, or a hardware component such as an FPGA (Field Programmable Gate Array) or an ASIC (Application Specific Integrated Circuit) and the modules each perform allocated functions. However, the modules are not limited to software or hardware. The components may be configured in an addressable storage medium, or may be constructed to run on at least one processor. The functions provided by the components and the modules may be combined into fewer components and or modules may be separated into additional components.

Figure 15:
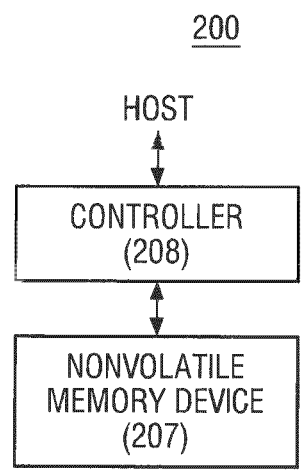
FIG. 15 is a block diagram illustrating a storage device according to an embodiment of the present general inventive concept.

FIG. 15 is a block diagram illustrating a storage device 200 according to an embodiment of the present general inventive concept. Referring to FIG. 15, the storage device 200 includes a nonvolatile memory device 207 and a controller 208. The previously described storage device 200 of FIG. 1 may be configured as illustrated in FIG. 15.

Here, the nonvolatile memory device 207 may include at least one of the memory devices 206 described above.

The controller 208 is connected to a host and the nonvolatile memory device 207. In response to a request from the host, the controller 208 is constructed (configured) to access the nonvolatile memory device 207. For example, the controller 208 is constructed to control read, write, erase and background operations of the nonvolatile memory device 207. The controller 208 is constructed to provide an interface between the nonvolatile memory device 207 and the host. The controller 208 is constructed to drive firmware to control the nonvolatile memory device 207.

As an example, the controller 208 may further include components such as a random access memory (RAM), a processing unit, a host interface, and a memory interface. The RAM is used as at least one of an operating memory of the processing unit, a cache memory between the nonvolatile memory device 207 and the host, and a buffer memory between the nonvolatile memory device 207 and the host. The processing unit controls the overall operation of the controller 208.

The host interface includes a protocol for performing data exchange between the host and the controller 208. As an example, the controller 208 may be constructed to communicate with an external device, for example, a host using any one of various types of interface protocols such as a Universal Serial Bus (USB), a Multi Media Card (MMC), a Peripheral Component Interconnect (PCI), a Peripheral Component Interconnect-Express (PCI-E), Serial Advanced Technology Attachment (SATA), Parallel ATA (PATA), Small Computer System Interface (SCSI), Enhanced Small Device Interface (ESDI), and Integrated Drive Electronics (IDE).

In addition, the controller 208 may be constructed (configured) to communicate with an external host through at least one of various interface protocols, such as Integrated Drive Electronics (IDE) protocol. The memory interface interfaces with the nonvolatile memory device 207. For example, the memory interface includes a NAND interface or a NOR interface.

The storage device 200 may be constructed (configured) to additionally include an error correction block. The error correction block may be constructed to detect an error of data read from the nonvolatile memory device 207 using an error correction code (ECC). As an example, the error correction block is provided as a component of the controller 208. The error correction block may also be provided as a component of the nonvolatile memory device 207.

For example, the controller 208 and the nonvolatile memory device 207 may be integrated into one semiconductor device and may be any type of memory card such as a PC card (PCMCIA, personal computer memory card international association), a compact flash (CF) card, a smart media card (SM or SMC), a memory stick, a multimedia card (MMC, RS-MMC or MMCmicro), a secure digital card (SD, miniSD, microSD, or SDHC), a universal flash storage (UFS) card, and the like.

Figure 16:
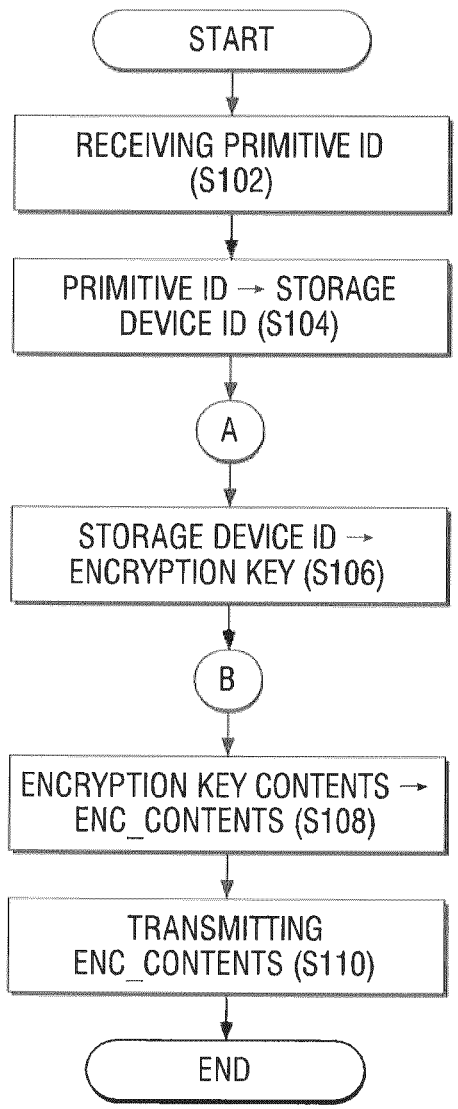
FIG. 16 is a flowchart illustrating a content encryption method according to an embodiment of the present general inventive concept.

The controller 208 and the nonvolatile memory device 207 may be integrated into one semiconductor device, constituting a solid state drive (SSD). The SSD includes a memory device constructed to store data in the semiconductor memory. When the storage device 200 is used as the SSD, the operating speed of the host connected to the storage device 200 is remarkably increased. The host may be a content recording device or a content storing server to encrypt one or more contents and to store the encrypted contents in a storage device FIG. 16 is a flowchart illustrating a content encryption method according to an embodiment of the present general inventive concept.

The content encryption method according to an embodiment of the present general inventive concept may include encrypting one or more contents in the content recording device 100 of FIG. 1, for example, and storing the encrypted content in the storage device 200 of FIG. 1, for example.

The storage device 200, including the memory device, may store data of the encrypted content in the memory device.

The storage device 200, including a magnetic storage device as the memory device, may store data of the encrypted content in the magnetic storage device. The magnetic storage device may be, for example, a hard disk.

The storage device 200, including an optical storage device as the memory device, may store data of encrypted content in the optical storage device. The optical storage device may be, for example, a compact disk or a DVD disk.

The storage device 200 stores a primitive ID. According to an embodiment of the present general inventive concept, the primitive ID may be basic data usable to calculate the media ID. Here, the primitive ID may be data different from the media ID. According to an embodiment of the present general inventive concept, the primitive ID may be used as the media ID as it is.

The content recording device 100 receives the primitive ID at operation S102, and the media ID that is an identifier specific to the storage device 200 can be calculated from the primitive ID.

The primitive ID includes a first primitive ID and a second primitive ID. The content recording device 100 may calculate the media ID by combining a second ID converted from the second primitive ID with the first primitive ID. The method of calculating the media ID will later be described in more detail with reference to FIGS. 17 to 20.

The content recording device 100 generates a content encryption key using the media ID at operation S106. The media ID is used in generating the content encryption key, which means that the media ID is input at least once to generate the content encryption key. The generating of the content encryption key will later be described in more detail with reference to FIGS. 20 to 24.

The content recording device 100 encrypts content using the content encryption key to then additionally generate encrypted content with the original of the content left as it is or to convert the original of the content into encrypted content at operation S108.

The encrypted content is provided to the storage device 200 at operation S110, and the storage device 200 stores the encrypted content. As illustrated in FIG. 1, the content recording device 100 may store the encrypted content in the storage device 200 from which the primitive ID is provided. A decryption key of the encrypted content is calculated from the primitive ID of the storage device 200 storing the encrypted content. Thus, the storage device providing the primitive ID and the storage device storing the encrypted content may not be different from each other.

As illustrated in FIG. 16, the content recording device 100 may not provide the content encryption key to the storage device 200 nor make the content encryption key included in the encrypted content. Therefore, in order to obtain the decryption key of the encrypted content, it is necessary to obtain the primitive ID of the storage device 200 storing the encrypted content, to calculate the media ID of the storage device 200 storing the encrypted content from the primitive ID to then generate the decryption key from the media ID. The content playing device 300 intending to play the encrypted content cannot obtain the decryption key of the encrypted content directly from the storage device 200. Therefore, according to the content encrypting method shown in FIG. 16, it is possible to prevent the encrypted content from being decrypted even if the encrypted content are illegally copied to another storage device, which will later be described with reference to FIG. 26.

An operation S104 of the content recording device 100 calculating the media ID from the primitive ID will be described in more detail with reference to FIGS. 17 to 19.

Figure 17:
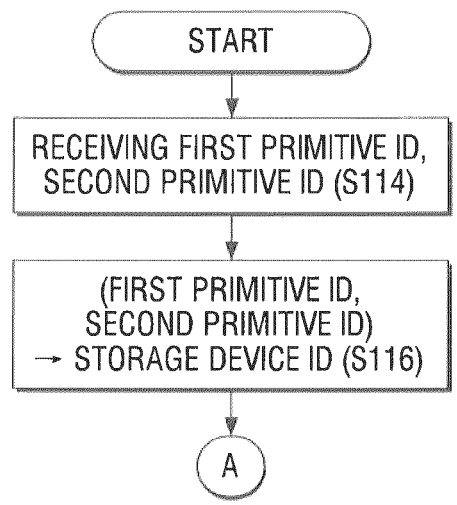
FIGS. 17 to 20 are flowcharts illustrating a media ID calculating method according to an embodiment of the present general inventive concept.

FIG. 17 illustrates a media ID calculating method corresponding to at least an operation 104 and an operation A when the storage device 200 includes a first portion and a second portion, and a first primitive ID to identify the first portion and a second primitive ID to identify the second portion 202 are stored in the storage device 200.

The first portion and the second portion are elements or modules provided in the storage device 200, and may be an element group or a module group that performs specific functions. For example, the second portion may be a memory device, and the first portion may be a controller to control the memory device. In addition, when a plurality of memory devices are provided in the storage device 200, the first portion may be one of the plurality of memory devices, and the second portion may be the other of the plurality of memory devices.

As illustrated in FIG. 17, the content recording device 100 receives the first primitive ID and the second primitive ID stored in the storage device 200 from the storage device 200 at operation S114.

The content recording device 100 calculates the media ID using at least one of the first primitive ID and the second primitive ID at operation S116. When the content recording device 100 calculates the media ID using only the first primitive ID, the media ID is specified by the first portion. When the content recording device 100 calculates the media ID using only the second primitive ID, the media ID is specified by the second portion. When the content recording device 100 calculates the media ID using both of the first primitive ID and the second primitive ID, the media ID is specified by both of the first portion and the second portion.

Figure 18:
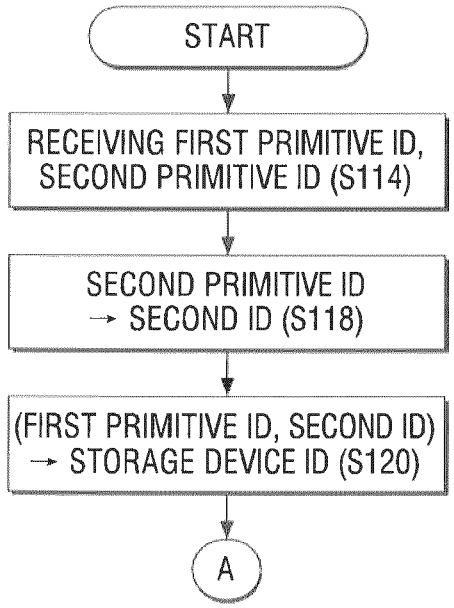
Figure 19:
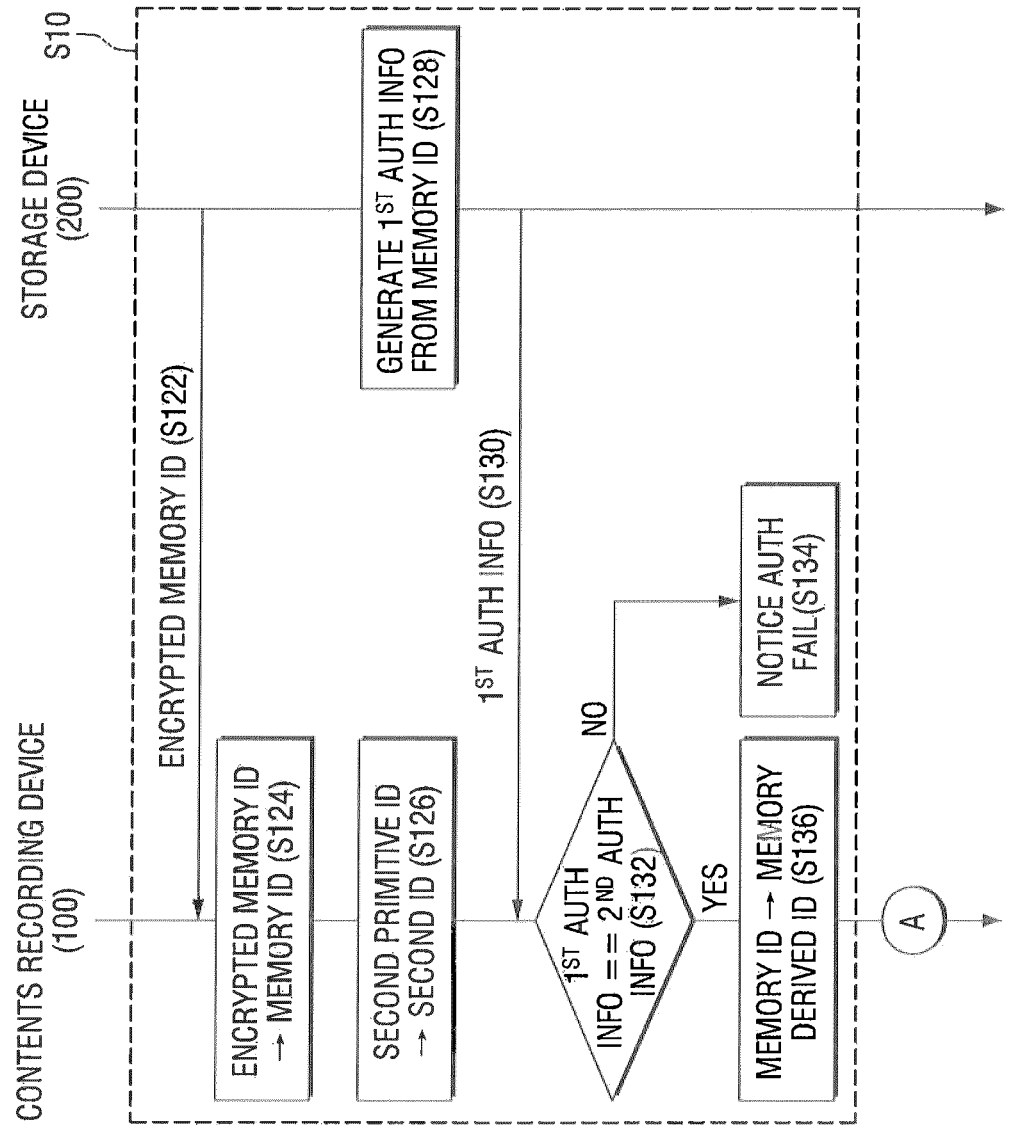

FIG. 18 illustrates a case where the second primitive ID provided from the storage device 200 to the content recording device 100 is data encrypted from an ID of the second portion.

As illustrated in FIG. 18, the content recording device 100 may receive the first primitive ID and the second primitive ID stored in the storage device 200 from the storage device 200 at operation S114 and may then convert the second primitive ID into a second ID at operation S118. The content recording device 100 may use the second ID rather than the second primitive ID in calculating the media ID. That is, the content recording device 100 may calculate the media ID using at least one of the first primitive ID and the second ID at operation S120.

The second primitive ID is the ID of the second portion encrypted for the purpose of preventing the ID of the second portion from being leaked.

Figure 20:
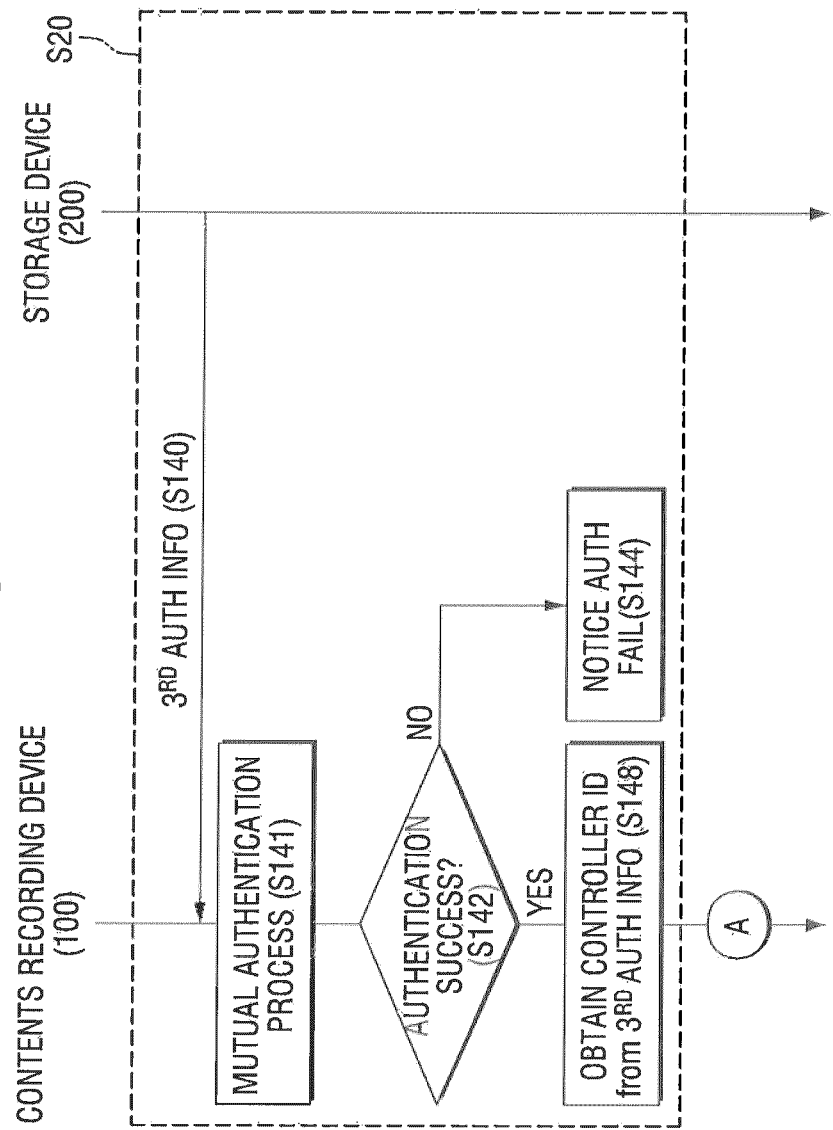

The operation of calculating the media ID will be described with reference to FIGS. 19 and 20. The second portion may be a memory device, while the first portion may be a controller to control the memory device.

The memory device 206 may store the memory ID in a secured area from which data is not output in spite of a data output request of an external device including the content recording device 100. The memory ID is a unique ID given to the memory device 206.

The memory device 206 may further store an encrypted memory ID of the memory ID. Unlike the memory ID stored in the area from which data is not output in spite of a data output request of an external device, the storage device 200 may provide the encrypted memory ID to the content recording device 100 as per the request of the content recording device 100 at operation S122. The encrypted memory ID may be understood as being the same as the second primitive ID described above with reference to FIG. 18.

An operation S10 of generating the memory derived ID that can be used as another ID of the memory device 206 will be described. The memory derived ID may be understood as being the same as the second primitive ID described above with reference to FIG. 18.

The content recording device 100 receives the encrypted memory ID from the storage device 200 at operation S122 and decrypts the encrypted memory ID to then generate the memory ID at operation S124. The content recording device 100 may receive a secondary encryption key stored in the storage device 200 and may decrypt the secondary encryption key using a second secondary key stored in the content recording device 100 to then decrypt the encrypted memory ID using the secondary key.

The content recording device 100 generates second authentication information using the memory ID at operation S126 corresponding to the operation S118 of FIG. 18. The content recording device 100 may generate a random number, generate a session key by encrypting the random number, and generate the second authentication information by inputting the memory ID and the session key into a predetermined one-way function. The one-way function may be an exclusive OR (XOR) operation among bit operations applying, for example, two operands, as inputs, when it is impossible to calculate input values from output values.

Meanwhile, the storage device 200 also generates first authentication information using the memory ID at operation S128. The memory device 206 may further store a set of a plurality of secondary keys in addition to the memory ID and the encrypted memory ID. The storage device 200 encrypts one of the set of secondary keys, re-encrypts the encrypted secondary key using the random number generated by the content recording device 100 as an encryption key to then generate the session key. The storage device 200 may input the session key and the memory ID into the predetermined one-way function to then generate the first authentication information.

The content recording device 100 receives the first authentication information from the storage device 200 at operation S130 to then verify whether it is identical with the second authentication information at operation S132. As the result of the verifying operation S132, if the first authentication information and the second authentication information are not identical with each other, it is processed that authentication fails at operation S134.

As the result of the verifying operation S132, if the first authentication information and the second authentication information are identical with each other, a memory derived ID is generated using the memory ID at operation S136. The memory derived ID may be generated by inputting the memory ID and an application specific secret value (ASSV) in a predetermined one-way function.

The ASSV may be given to each application executed in the content recording device 100. For example, different ASSV's may be given to a music recording application, a video recording application, and a software recording application. The ASSV may be a specific value according to the content type or the encrypted content provider identifying information.

It is possible that the ASSV may have a specific value according to the type of encrypted content. The content type may be one selected from a motion picture, a document, software, and so on.

Next, an operation S20 of the content recording device 100 receiving an ID of the controller 202 from the storage device 200 will be described with reference to FIG. 20.

The content recording device 100 receives third authentication information from the storage device 200 at operation S140. As described above, the third authentication information may include an authentication certificate of the storage device 200 and a primitive ID of the controller 202 provided in the storage device 200.

At operation S141, mutual authentication is performed between the content recording device 100 and the storage device 200. The mutual authentication may be based on a public key. When the mutual authentication at operation S142 fails, it is processed that the content recording device 100 fails in authentication at operation S144. The content recording device 100 may obtain the controller ID from the third authentication information at operation S148.

The content recording device 100 calculates a media ID using at least one of the memory derived ID and the controller ID. It is possible that the content recording device 100 calculates the media ID using both of the memory derived ID and the controller ID.

The content recording device 100 may set the data resulting from a binary operation performed on the memory derived ID and the controller ID as the media ID. For example, the media ID may be generated by performing a binary operation requiring two operands, such as AND, OR, or XOR, on the memory derived ID and the controller ID.

The content recording device 100 may set as the media ID, the data resulting from string concatenation in which the controller ID is connected after the memory derived ID. The media ID may also be the data resulting from string concatenation in which the memory derived ID is connected after the controller ID.

An operation S106 of the content recording device 100 generating the content encryption key using the media ID will be described in detail with reference to FIGS. 21 to 24.

Figure 21:
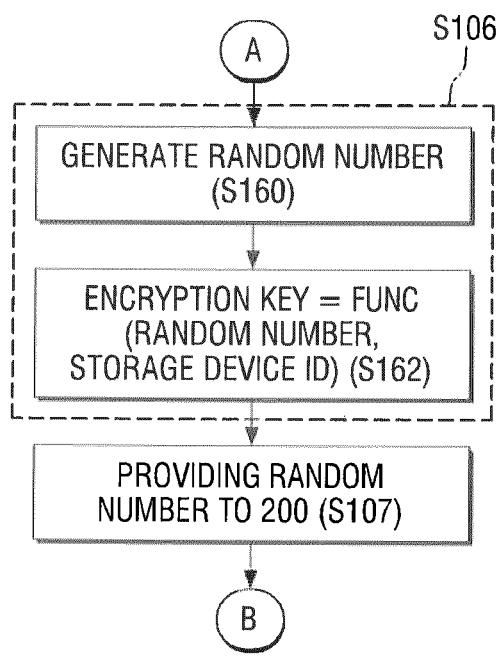
FIGS. 21 to 24 are flowcharts illustrating a method of generating a content encryption key from a media ID according to an embodiment of the present general inventive concept.

According to an embodiment of the present general inventive concept, as illustrated in FIG. 21, the content recording device 100 may generate the content encryption key using the media ID and the random number. The content recording device 100 may generate a random number having a predefined number of bits at operation S160 and may generate the content encryption key by inputting the random number and the media ID into a predetermined function algorithm at operation S162. For example, the content recording device 100 may set the data obtained by inputting the media ID and the random number into a cipher-based message authentication code (CMAC) algorithm as the content encryption key.

As described above, the content encryption key may not be provided to the storage device 200. Instead, the content recording device 100 provides the random number to the storage device 200 to be stored therein at operation S107. The reason why the random number is applied to the storage device 200 is that the random number is required in generating the content decryption key.

Figure 22:
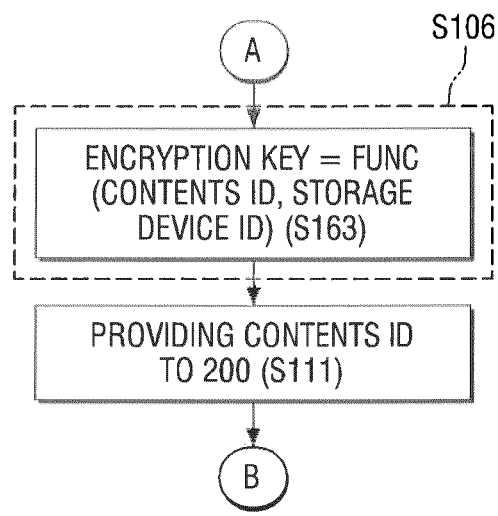

Referring to FIG. 22, the content recording device 100 may generate the content encryption key using a content ID and a storage device ID at operation 163 corresponding to the operation S106. The content recording device 100 may generate the content ID and store the content ID in the storage device 200 at operation S111.

Figure 23:
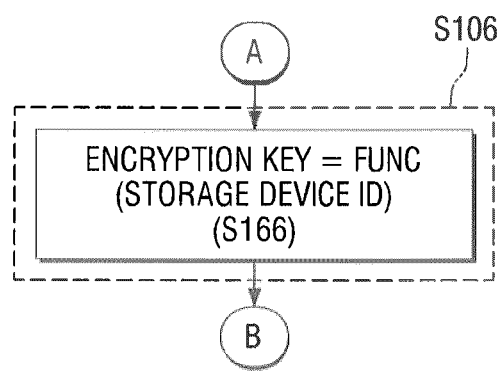

Referring to FIG. 23, the content recording device 100 may generate the content encryption key using a storage device ID at operation 166 corresponding to the operation S106.

Figure 24:
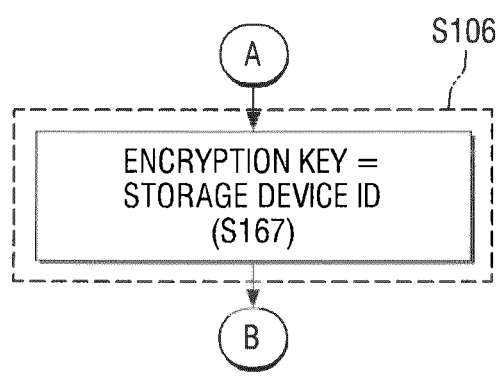

Referring to FIG. 24, the content recording device 100 may generate the content encryption key according to a storage device ID at operation 167 corresponding to the operation S106.

Hereinafter, a content decryption method according to an embodiment of the present general inventive concept will be described with reference to FIGS. 25 to 27.

Figure 25:
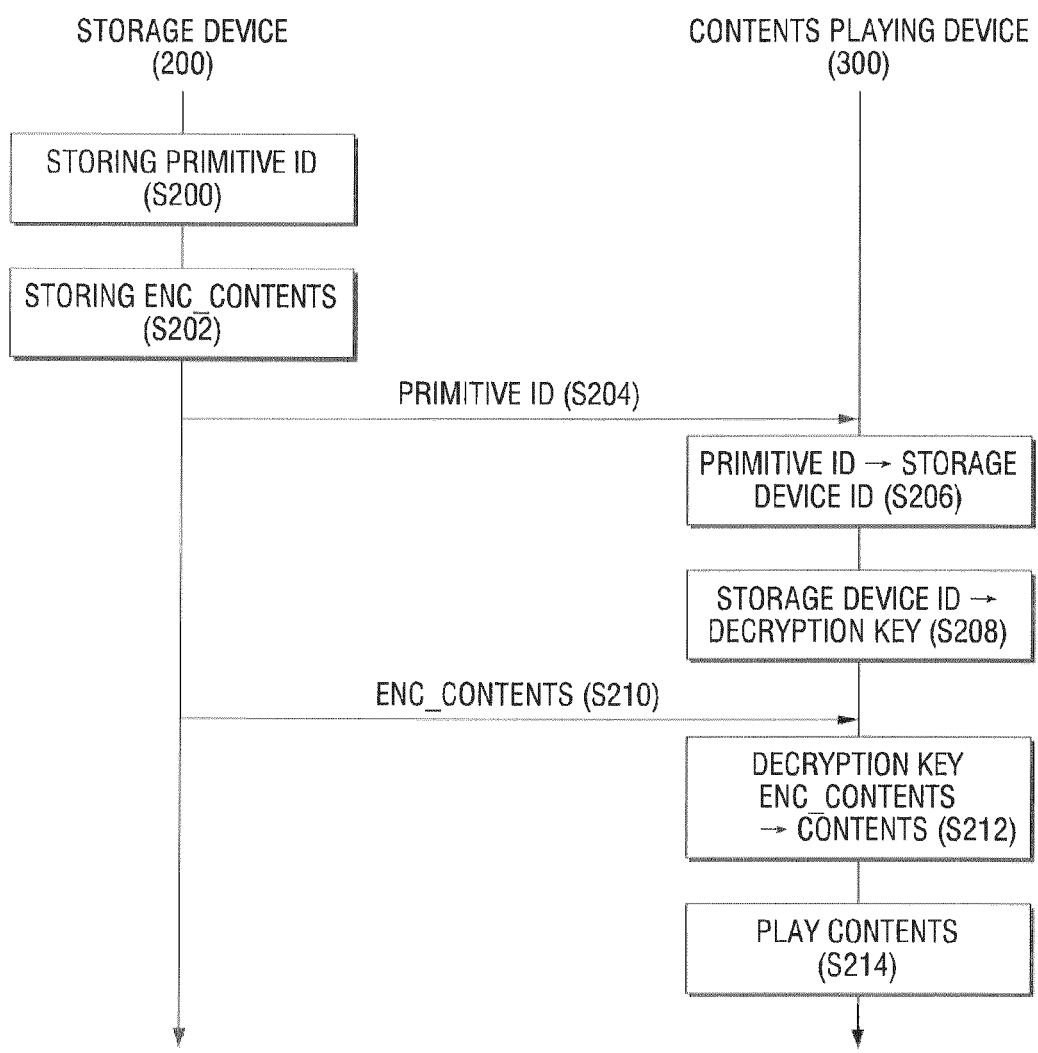
FIG. 25 is a flowchart illustrating a content decryption method according to an embodiment of the present general inventive concept.
Figure 26:
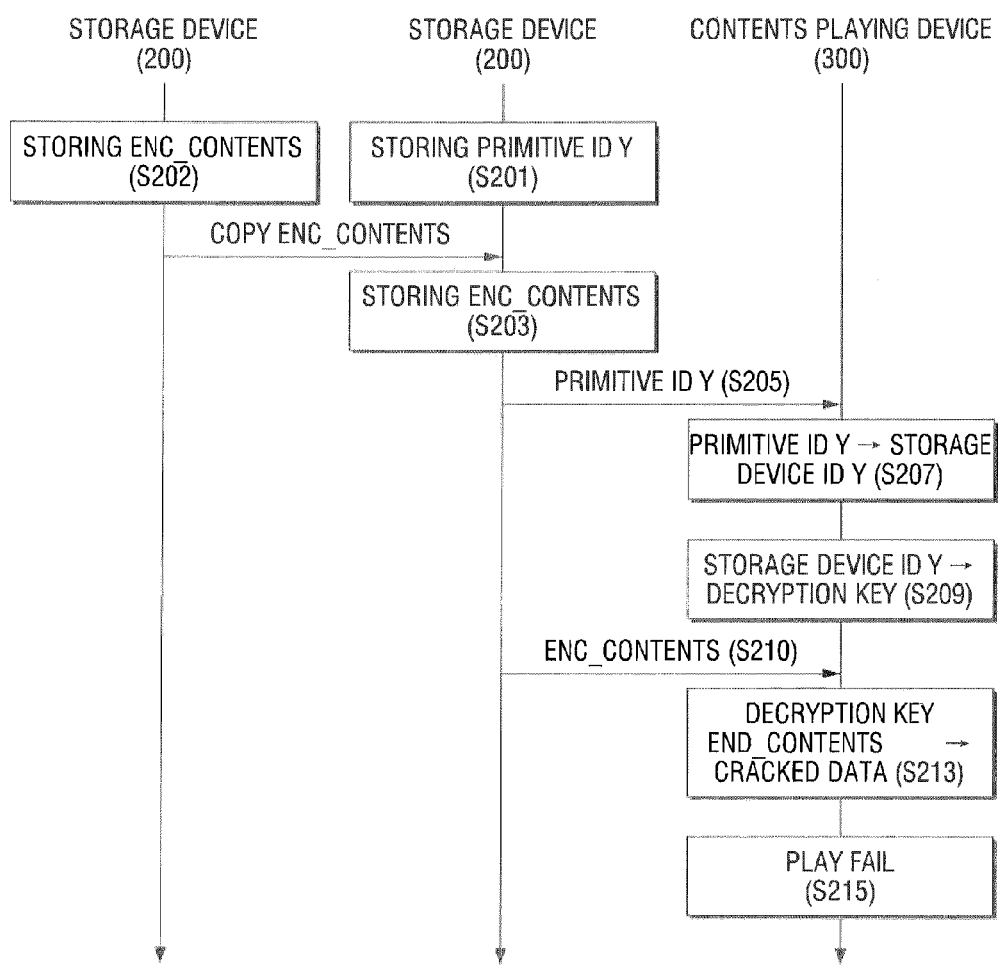
FIG. 26 is a flowchart illustrating a content decryption method in a case of content piracy according to an embodiment of the present general inventive concept.

FIG. 25 is a flowchart illustrating a method of a content playing device 300 decrypting encrypted content stored in the storage device 200 according to an embodiment of the present general inventive concept.

A primitive ID of the storage device 200 and encrypted content are stored in the storage device 200 at operations S200 and S202.

The content playing device 300 receives the primitive ID from the storage device 200. Although not illustrated in FIG. 25, the content playing device 300 may make a request to provide the primitive ID to the storage device 200 and may receive the primitive ID in response to the request at operation S204. For example, when a play command for the encrypted content is input by a user, the content playing device 300 may make a request to provide the primitive ID.

The content playing device 300 calculates a media ID using the primitive ID at operation S206. The operation of the content playing device 300 calculating the media ID may be the same as the operation of the content recording device 100 calculating the media ID as described above with reference to FIGS. 17 to 20.

The content playing device 300 generates a content decryption key using the media ID at operation S208.

When the encrypted content stored in the storage device 200 are encrypted by the content recording device 100 illustrated in FIG. 21, the content playing device 300 may read a random number from the storage device 200 and may generate the content decryption key by inputting the random number and the media ID into a predetermined function or algorithm at operation S208.

When the encrypted content stored in the storage device 200 are encrypted by the content recording device 100 illustrated in FIG. 22, the content playing device 300 may read a content ID from the storage device 200 or receive the content ID from a content ID providing server (not illustrated) and may generate the content decryption key by inputting the random number and the media ID into a predetermined function or algorithm at operation S208.

When the encrypted content stored in the storage device 200 are encrypted by the content recording device 100 illustrated in FIG. 23, the content playing device 300 may generate the content decryption key by inputting the media ID into a predetermined function or algorithm at operation S208.

When the encrypted content stored in the storage device 200 are encrypted by the content recording device 100 illustrated in FIG. 24, the content playing device 300 may use the media ID as the content decryption key as it is at operation S208.

Referring again to FIG. 25, the operation following after the operation at operation S208 of the content playing device 300 generating the decryption key will be described. After reading the encrypted content stored in the storage device 300, at operation S210, the content playing device 300 decrypts the encrypted content using the content decryption key at operation S212, and plays the decrypted content at operation S214.

The operation of the content playing device 300 failing to decrypting the encrypted content stored in the storage device Y 201 when encrypted content stored in a storage device X 200 are illegally copied to another storage device Y 201 will be described with reference to FIG. 26.

A primitive ID Y different from a primitive ID X of the storage device X 200 is stored in the storage device Y 201 at operation S201.

In addition, content encrypted by the content encryption method shown in FIG. 1 are stored in the storage device X 200 at operation S202. Hereinafter, it is assumed that a user illegally copies the encrypted content stored in the storage device X 200 to the storage device Y 201 at operation S203.

When the user connects the storage device Y 201 to the content playing device 300 and inputs a play command of the encrypted content to the content playing device 300, the content playing device 300 receives the primitive ID Y stored in the storage device Y 201 at operation S205.

The content playing device 300 generates a media ID of the storage device Y 201 using the primitive ID Y at operation S207.

The content playing device 300 generates a decryption key using the media ID at operation S209.

The content playing device 300 attempts to decrypt the encrypted content received from the storage device Y 201 in operation at operation S210 using the generated decryption key at operation S213. However, since the decryption key generated in operation at operation S209 is different from the decryption key of the encrypted content, the content playing device 300 cannot decrypt the encrypted content.

Therefore, the content playing device 300 cannot play the encrypted content stored in the storage device Y 201 after being prevented from an unauthorized or illegal copy from the storage device X 200 at operation S215.

Figure 27:
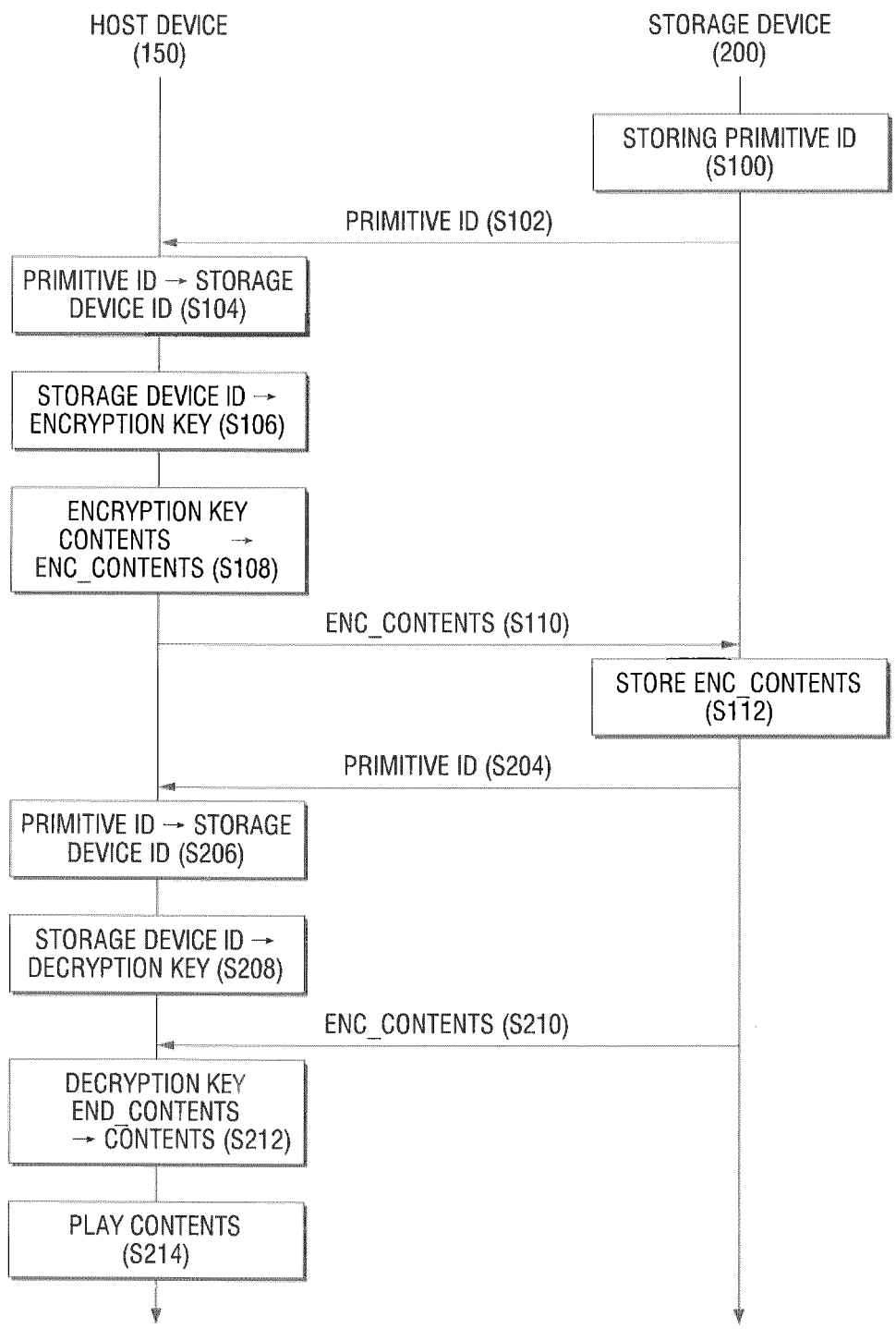
FIG. 27 is a flowchart illustrating a content decryption method according to an embodiment of the present general inventive concept.

FIG. 27 illustrates a content encryption/decryption method when a content encryption device and a content decryption device are equal to each other, that is, a host device 150.

The host device 150 according to the illustrated embodiment receives a primitive ID stored in the storage device 200 from the storage device 200 at operation S102, calculates a media ID of the storage device 200 at operation S104, generates an encryption key from the media ID (S106), encrypts content using the encryption key at operation S108 and stores the encrypted content in the storage device 200 at operation S110.

In order to decrypt the encrypted content stored in the storage device 200 and then play the same, the host device 150 receives the primitive ID stored in the storage device 200 from the storage device 200 at operation S204, calculates the media ID of the storage device 200 at operation S206, generates a decryption key from the media ID at operation S208, decrypts encrypted content using the encryption key at operation S212 and plays the decrypted content at operation S214.

While FIG. 27 illustrates that the host device 150 performs the content encryption method illustrated in FIG. 16 and the content decryption method illustrated in FIG. 25, the present general inventive concept is not limited to the content encryption method and the content decryption method performed by the host device 150 according to the illustrated embodiment to those illustrated in FIGS. 16 and 25. It is possible that the host device 150 may perform the content encryption method according to the embodiment of FIGS. 16 to 24 and may perform the content decryption method corresponding to the performed encryption method.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, according to the present invention, since a decryption key for decrypting encrypted content stored in the storage device are stored in the storage device is obtained from the storage device ID, and the storage device ID is obtained from the storage device at a decryption time, the encrypted content cannot be decrypted even when the encrypted content are illegally copped to another storage device.

According to the above-described embodiment of the present general inventive concept, particular encrypted content are decrypted only when they are stored in a particular storage device, thereby making it impossible for the particular encrypted content to be used in another storage device when the particular encrypted content are leaked.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A content recording device comprising:
a storage device interface configured to receive from an external storage device a first primitive ID and a second primitive ID to identify the external storage device; and
a processor configured to generate a media ID that is a unique ID of the storage device using the first primitive ID and the second primitive ID, to generate an encryption key using the media ID, and to encrypt one or more contents using the encryption key to output the encrypted content to the external storage device,
wherein the storage device interface provides the encrypted content to the storage device,
wherein the storage device includes a memory device and a memory controller to control the memory device, and
wherein the first primitive ID is a controller ID that is a unique ID of the memory controller to identify the memory controller and is stored in the memory device, and the second primitive ID is an encrypted memory ID that is a unique ID of the memory device to identify the memory device and is stored in the memory device.

2. The content recording device of claim 1, wherein the processor comprises:
an ID calculating unit to obtain a memory ID by decrypting the encrypted memory ID, to generate a memory derived ID using the memory ID, which is another unique ID of the memory device, and to calculate the media ID using the controller ID and the memory derived ID;
an encryption key generating unit to generate the encryption key using the media ID; and
an encrypting unit to encrypt the content using the encryption key.

3. The content recording device of claim 1, wherein:
the storage device interface further receives first authentication information from the storage device; and
the processor comprises an authentication information generating unit to generate the memory ID by decrypting the encrypted memory ID and to generate second authentication information using the memory ID, and a derived ID generating unit to calculate a memory derived ID using the memory ID if the first authentication information is identical with the second authentication information.

4. The content recording device of claim 3, wherein the processor further comprises an ID calculating unit to calculate the media ID using at least one of the memory derived ID calculated by the derived ID calculating unit and the controller ID.

5. The content recording device of claim 3, wherein:
the storage device interface further receives third authentication information for a public key based mutual authentication between the external storage device and the content recording device; and
the processor further comprises a mutual authentication unit to perform the mutual authentication using the third authentication information wherein the controller ID is obtained from the third authentication information, and an ID calculating unit to calculate the media ID using at least one of the memory derived ID calculated by the derived ID calculating unit and the controller ID obtained by the mutual authentication unit.

6. The content recording device of claim 1, wherein:
the processor generates the encryption key using a random number and the media ID; and
the storage device interface further provides the random number to the external storage device.

7. The content recording device of claim 6, wherein the processor comprises:
an ID calculating unit to calculate a unique ID of the external storage device using at least one of the first primitive ID and the second primitive ID;
a random number generating unit to generate the random number;
an encryption key generating unit to generate the encryption key using the unique ID and the random number; and
an encrypting unit to encrypt the content to the encryption key.

8. The content recording device of claim 7, wherein the encryption key generating unit generates the encryption key by inputting the unique ID and the random number into a cipher-based message authentication code (CMAC) algorithm.

9. The content recording device of claim 1, wherein;
the processor generates the encryption key using the media ID and an ID of the content; and
the storage device interface further provides the ID of the content to the external storage device.

10. The content recording device of claim 1, wherein the processor sets the media ID to an input parameter of a predetermined routine having one input parameter and one output, executes the routine and uses the output data of the routine as the encryption key.

11. The content recording device of claim 10, wherein the routine is a one-way function.

12. A storage device comprising:
a memory device configured to store encrypted content that is decrypted using a decryption key, the decryption key being generated using a media ID and a primitive ID, the media ID being a unique ID of the storage device; and
a controller to control the memory device, to output the media ID and the primitive ID to an external content recording device, to receive the encrypted content from the external content recording device, and to output the media ID, the primitive ID and the stored encrypted content to an external content playing device,
wherein the primitive ID includes a controller ID that is a unique ID of the controller and an encrypted memory ID, the encrypted memory ID being a unique ID of the memory device, and the media ID is generated using a memory derived ID generated from the encrypted memory ID and the controller ID,
wherein the encrypted memory ID is derived from a memory ID stored in a first area of the memory device and is stored in a second area of the memory device, and encrypted content is stored in a third area different from the first area, and the first area is an area that is not accessed by an accessing method for the third area and the second area is accessed by a read only access, and
wherein the memory device includes a security logic to access the encrypted memory ID stored in the second area in response to a read request for the memory ID.

13. The storage device of claim 12, wherein the memory device does not store the decryption key.

14. The storage device of claim 12, wherein the memory device further stores a random number used in generating the decryption key.

15. The storage device of claim 12, wherein the memory device further stores a content ID used in generating the decryption key.

16. A content playing device comprising:
a storage device interface configured to receive from an external storage device encrypted content stored in the storage device, a first primitive ID, and a second primitive ID, the first primitive ID and the second primitive ID being used to identify the external storage device; and
a processor configured to generate a media ID that is a unique ID of the external storage device using the first primitive ID and the second primitive ID, to generate a decryption key using the media ID, to decrypt the encrypted content using the decryption key, and to play the decrypted content,
wherein the external storage device includes a memory device and a memory controller to control the memory device, and wherein the first primitive ID is a controller ID that is a unique ID of the memory controller to identify the memory controller and is stored in the memory device, and the second primitive ID is an encrypted memory ID that is a unique ID of the memory device to identify the memory device and is stored in the memory device.

17. The content playing device of claim 16, wherein:
the processor generates second authentication information to perform first authentication between the content playing device and the external storage device using the encrypted memory ID;
the storage device interface further receives first authentication information for performing the first authentication from the external storage device; and
the processor compares the first authentication information with the second authentication information and generates the media ID if the first authentication information and the second authentication information are identical with each other.

18. The content playing device of claim 16, wherein:
the external storage device interface further receives from the external storage device a random number stored in the external storage device; and
the processor generates the decryption key by inputting the media ID and the random number into a CMAC algorithm.

19. The content playing device of claim 16, wherein:
the storage device interface further receives from the external storage device a content ID stored in the external storage device; and
the processor generates the decryption key by inputting the media ID and the content ID into a cipher-based message authentication code (CMAC) algorithm.

20. A content encrypting and storing method comprising:
receiving a primitive ID stored in a storage device from the storage device and calculating a media ID that is a unique ID of the storage device using the primitive ID in an external content recording device;
generating an encryption key using the media ID in the content recording device;
generating encrypted content by encrypting content using the encryption key in the content recording device; and
providing the encrypted content to the storage device from the content recording device to be stored in the storage device; and
providing the primitive ID and the stored encrypted content to an external content playing device from the storage device
wherein the storage device comprises a memory device controller and a memory device, and the calculating a media ID comprises:
receiving a controller ID stored in the memory device, the controller ID being a unique ID of the memory device controller, and receiving an encrypted memory ID that is a unique ID of the memory device and is stored in the memory device;
generating a memory derived ID based on the encrypted memory ID; and
calculating the media ID by performing string concatenation on the controller ID and the memory derived ID.

21. A non-transitory computer-readable medium to contain computer-readable codes as a program to execute the content encrypting and storing method of claim 20.

* * * * *